United States Patent
Ono et al.

(10) Patent No.: US 12,360,859 B2
(45) Date of Patent: Jul. 15, 2025

(54) STORAGE SYSTEM INCLUDING STORAGE NODES, STORAGE CONTROLLER PROCESSING DATA READING AND WRITING, AND VOLATILE MEMORY, AND STORAGE CONTROL METHOD

(71) Applicant: Hitachi, Ltd., Tokyo (JP)

(72) Inventors: Taisuke Ono, Tokyo (JP); Yoshinori Ohira, Tokyo (JP); Shintaro Ito, Tokyo (JP); Takahiro Yamamoto, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 102 days.

(21) Appl. No.: 18/120,015

(22) Filed: Mar. 10, 2023

(65) Prior Publication Data
US 2024/0176710 A1   May 30, 2024

(30) Foreign Application Priority Data
Nov. 28, 2022   (JP) .................. 2022-188843

(51) Int. Cl.
*G06F 11/00*   (2006.01)
*G06F 11/14*   (2006.01)

(52) U.S. Cl.
CPC ...... *G06F 11/1469* (2013.01); *G06F 11/1464* (2013.01); *G06F 11/1471* (2013.01)

(58) Field of Classification Search
None
See application file for complete search history.

(56) References Cited

U.S. PATENT DOCUMENTS

| | | | |
|---|---|---|---|
| 7,877,357 B1* | 1/2011 | Wu | G06F 11/1458 707/639 |
| 10,083,100 B1 | 9/2018 | Agetsuma et al. | |
| 2013/0091320 A1 | 4/2013 | Kawamura et al. | |
| 2019/0179710 A1* | 6/2019 | Derryberry | G06F 11/1451 |
| 2020/0241756 A1* | 7/2020 | Lee | G06F 3/065 |

FOREIGN PATENT DOCUMENTS

| | | |
|---|---|---|
| JP | 2014-517412 A | 7/2014 |
| JP | 2019-101703 A | 6/2019 |

OTHER PUBLICATIONS

Google Scholar/Patents search—text refined (Year: 2024).*
Google Scholar/Patents search—text refined (Year: 2025).*
Office Action received in JP Application No. 2022-188843, dated Feb. 4, 2025, in 7 pages, (with partial translation).

* cited by examiner

*Primary Examiner* — Christopher S McCarthy
(74) *Attorney, Agent, or Firm* — Procopio, Cory, Hargreaves & Savitch LLP

(57) ABSTRACT

A storage system includes one or more storage nodes each having a non-volatile storage device, a storage controller, and a volatile memory, in which the storage device includes a plurality of base image storage areas including at least a first base image storage area and a second base image storage area as areas for storing entire predetermined information stored in the memory as a base image, and the storage controller starts processing to store a next base image in the second base image storage area when the base image storage with respect to the first base image storage area is complete, and reads out the storage-completed base image and restores the image to the memory in a case where the predetermined information is lost from the memory.

12 Claims, 25 Drawing Sheets

FIG. 2
OVERVIEW OF MEMORY DATA SAVING-BASE IMAGE TWO-PLANE SAVING METHOD AT POWER FAILURE OCCURENCE
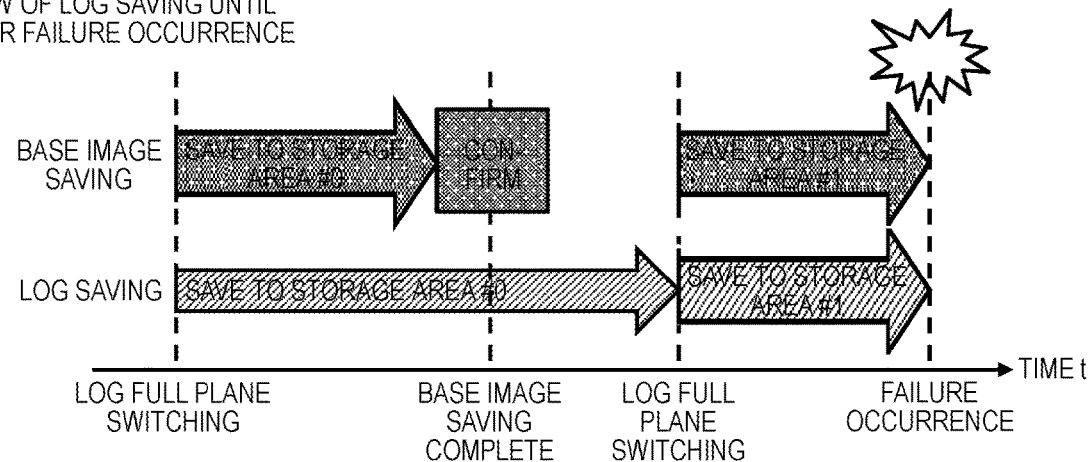
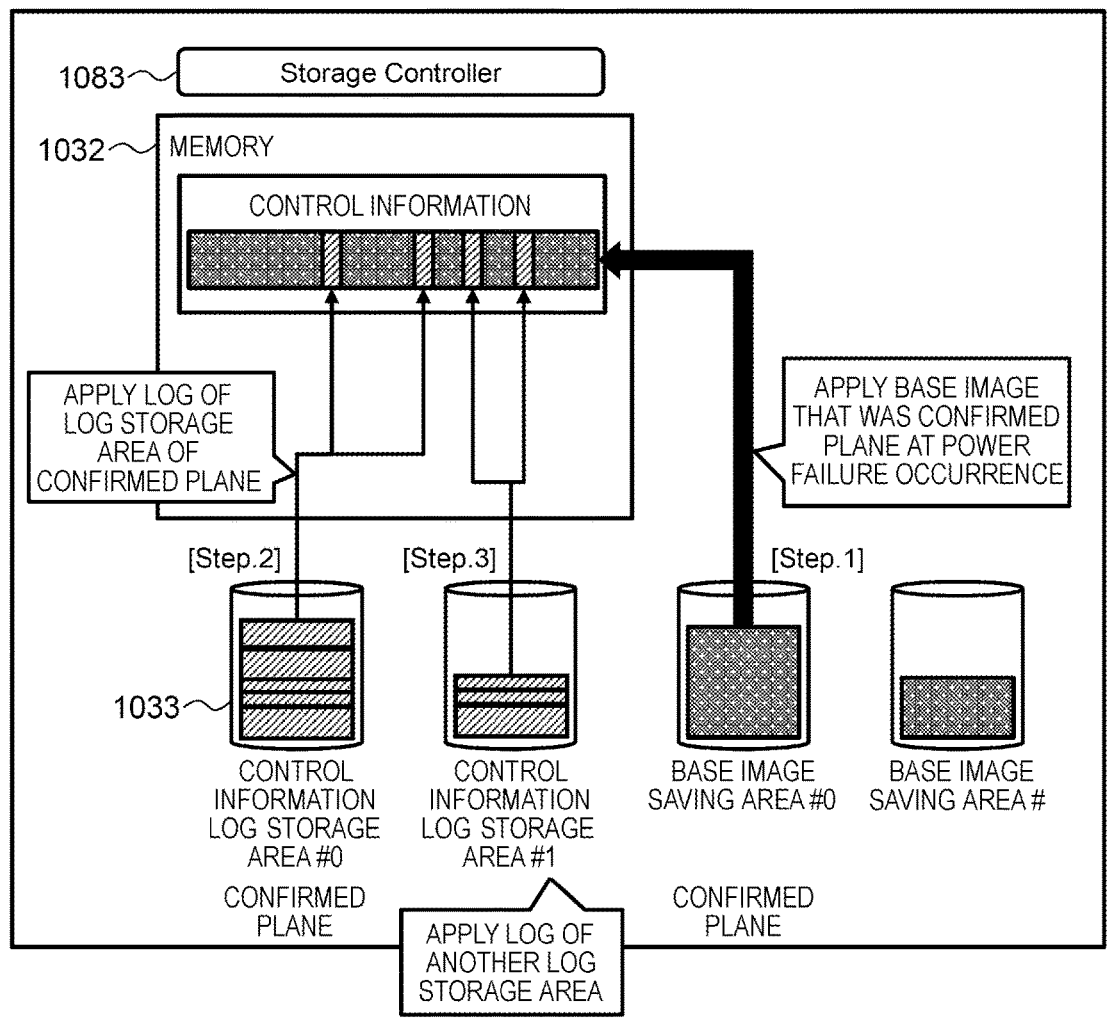

SYSTEM CONFIGURATION DIAGRAM

STORAGE NODE HARDWARE CONFIGURATION DIAGRAM

STORAGE NODE SOFTWARE MODULE DIAGRAM

LOGICAL CONFIGURATION

MEMORY INFORMATION LIST

FIG. 9
BASE IMAGE STORAGE AREA MANAGEMENT TABLE

| BASE IMAGE STORAGE AREA MANAGEMENT TABLE | | | | |
|---|---|---|---|---|
| CONFIRMED PLANE ID | SAVING PLANE ID | STORAGE AREA #0 | STORAGE AREA #1 | ... |
| | | SAVING RATE | SAVING RATE | |
| 0 | 1 | 100% | 80% | |

FIG. 10

LOG STORAGE AREA MANAGEMENT TABLE

MANAGEMENT TABLE IN METHOD IN WHICH SAME NUMBER OF LOG STORAGE AREAS AS BASE IMAGE STORAGE AREAS ARE PREPARED AND #0 AND #1 ARE ASSOCIATED

| LOG STORAGE AREA MANAGEMENT TABLE | | | | | | |
|---|---|---|---|---|---|---|
| STORAGE AREA #0 | | | STORAGE AREA #1 | | | ... |
| LOG HEAD ADDRESS (LBA) | LOG END ADDRESS (LBA) | RATE OF USE | LOG HEAD ADDRESS (LBA) | LOG END ADDRESS (LBA) | RATE OF USE | |
| 0x00 0000 | 0x66 6000 | 81% | 0x00 0000 | 0x40 0000 | 50% | |

MANAGEMENT TABLE IN METHOD IN WHICH INSIDE OF ONE STORAGE AREA IS DIVIDED INTO AREAS FOR LOG STORAGE AREAS #0 AND #1 RESPECTIVELY ASSOCIATED WITH BASE IMAGE STORAGE AREAS #0 AND #1

| LOG STORAGE AREA MANAGEMENT TABLE | | | | | |
|---|---|---|---|---|---|
| AREA FOR STORAGE AREA #0 | | AREA FOR STORAGE AREA #1 | | ... | RATE OF USE |
| LOG HEAD ADDRESS (LBA) | LOG END ADDRESS (LBA) | LOG HEAD ADDRESS (LBA) | LOG END ADDRESS (LBA) | | 50% |
| 0x00 0000 | 0x66 6000 | 0x66 6000 | 0x80 0000 | | |

STORAGE DEVICE INFORMATION LIST

FIG. 12
BASE IMAGE STORAGE AREA INFORMATION TABLE

| BASE IMAGE STORAGE AREA INFORMATION TABLE | | | |
|---|---|---|---|
| CONFIRMED PLANE ID | STORAGE AREA #0 | STORAGE AREA #1 | ... |
| | SEQUENCE NUMBER | SEQUENCE NUMBER | |
| 0 | 100 | 200 | |

FIG. 13

LOG STORAGE AREA INFORMATION TABLE

MANAGEMENT TABLE IN METHOD IN WHICH SAME NUMBER OF LOG STORAGE AREAS
AS BASE IMAGE STORAGE AREAS ARE PREPARED AND #0 AND #1 ARE ASSOCIATED

| LOG STORAGE AREA INFORMATION TABLE | | | | |
|---|---|---|---|---|
| STORAGE AREA #0 | | STORAGE AREA #1 | | ... |
| LOG HEAD ADDRESS (LBA) | LOG END ADDRESS (LBA) | LOG HEAD ADDRESS (LBA) | LOG END ADDRESS (LBA) | |
| 0x00 0000 | 0x66 6000 | 0x00 0000 | 0x40 0000 | |

MANAGEMENT TABLE IN METHOD IN WHICH INSIDE OF ONE STORAGE AREA IS DIVIDED
INTO AREAS FOR LOG STORAGE AREAS #0 AND #1 RESPECTIVELY ASSOCIATED WITH
BASE IMAGE STORAGE AREAS #0 AND #1

| LOG STORAGE AREA INFORMATION TABLE | | | | |
|---|---|---|---|---|
| AREA FOR STORAGE AREA #0 | | AREA FOR STORAGE AREA #1 | | ... |
| LOG HEAD ADDRESS (LBA) | LOG END ADDRESS (LBA) | LOG HEAD ADDRESS (LBA) | LOG END ADDRESS (LBA) | |
| 0x00 0000 | 0x66 6000 | 0x66 6000 | 0x80 0000 | |

FIG. 14

LOG HEADER

| LOG HEADER | |
|---|---|
| FIELD | VALUE |
| LOG SEQUENCE NUMBER | 210 |
| UPDATE ADDRESS | 0x0000 1000 |
| UPDATE SIZE | 32 |

STORAGE SYSTEM INCLUDING STORAGE NODES, STORAGE CONTROLLER PROCESSING DATA READING AND WRITING, AND VOLATILE MEMORY, AND STORAGE CONTROL METHOD

BACKGROUND OF THE INVENTION

1. Field of the Invention

The present invention relates to a storage system and a storage control method.

2. Description of Related Art

In the related art, a redundancy configuration for availability and reliability improvement is adopted in a storage system.

For example, JP2019-101703A proposes the following storage system.

In the storage system with a plurality of storage nodes, each storage node is provided with at least one storage device providing a storage area and at least one storage control unit reading and writing requested data with respect to a corresponding storage device in response to a request from a higher device. Each storage control unit retains predetermined configuration information necessary for reading and writing the requested data with respect to the corresponding storage device in response to the request from the higher device, a plurality of pieces of control software are managed as a redundancy group, the configuration information pieces respectively retained by the control software pieces belonging to the same redundancy group are updated synchronously, and the plurality of pieces of control software configuring the redundancy group are disposed in the different storage nodes for load distribution at each storage node.

According to JP2019-101703A, a storage system enabling reading and writing continuation even in the event of a node failure can be constructed using a software-based storage system construction technique (software-defined storage: SDS). It is required to protect various data by making the data non-volatile in order to improve the performance and reliability of such a storage system. The invention proposes a technique for protecting control information, cache data, and so on in a storage system.

SUMMARY OF THE INVENTION

In order to achieve the above object, one representative storage system of the invention is a storage system including one or more storage nodes each having a non-volatile storage device, a storage controller processing data reading and writing with respect to the storage device, and a volatile memory, in which the storage device includes a plurality of base image storage areas including at least a first base image storage area and a second base image storage area as areas for storing entire predetermined information stored in the memory as a base image, and the storage controller performs processing to store the base image in the first base image storage area and, when the base image storage with respect to the first base image storage area is complete, starts processing to store a next base image in the second base image storage area, and performs recovery processing to read out the storage-completed base image and restore the image to the memory in a case where the predetermined information is lost from the memory.

In addition, one representative storage control method of the invention is a storage control method in a storage system including one or more storage nodes each having a non-volatile storage device, a storage controller processing data reading and writing with respect to the storage device, and a volatile memory, the method including: a step in which the storage controller stores entire predetermined information stored in the memory as a base image in a first base image storage area provided in the storage device; a step in which the storage controller stores a next base image in a second base image storage area provided in the storage device when the base image storage with respect to the first base image storage area is complete; and a step in which the storage controller performs recovery processing to read out the storage-completed base image and restore the image to the memory in a case where the predetermined information is lost from the memory.

According to the invention, a high-performance and high-reliability storage system can be realized.

BRIEF DESCRIPTION OF THE DRAWINGS

FIG. 2 is an explanatory diagram of recovery processing following control information loss;

FIG. 9 is an explanatory diagram of a base image storage area management table;

FIG. 10 is an explanatory diagram of a log storage area management table;

FIG. 12 is an explanatory diagram of a base image storage area information table;

FIG. 13 is an explanatory diagram of a log storage area information table written to the storage device;

FIG. 14 illustrates a structure of a log header;

DESCRIPTION OF EMBODIMENTS

Figure 1:
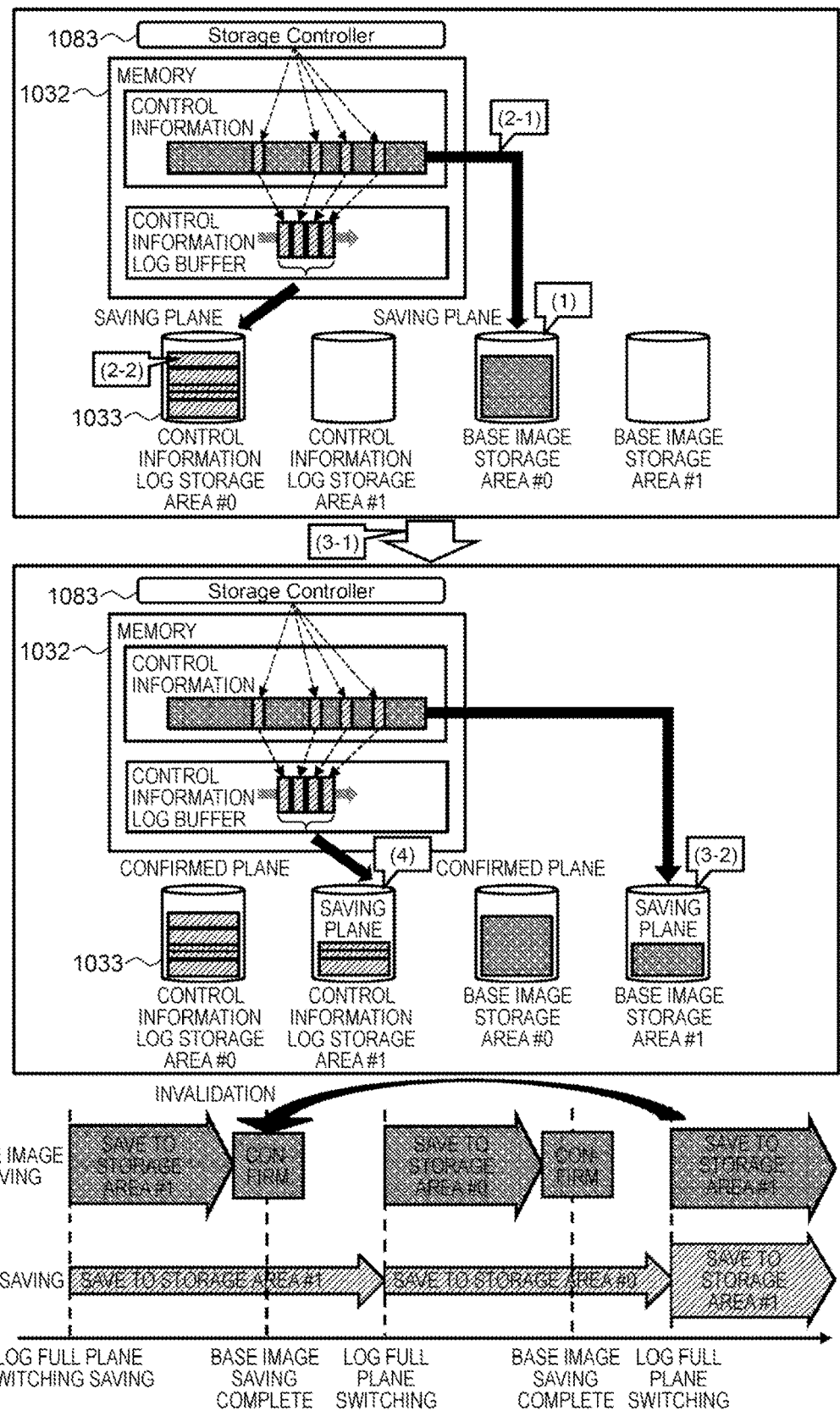
FIG. 1 is an explanatory diagram regarding control information saving.

Hereinafter, an embodiment of the invention will be described in detail with reference to the drawings. The embodiment relates to, for example, a storage system including a plurality of storage nodes where at least one SDS is implemented.

In the disclosed embodiment, the storage node stores control information or cache data on a memory. Further, the storage node includes a non-volatile device. In updating control information or data in response to a write request from a host, the storage node stores update data in log format in this non-volatile device. As a result, the update data can be made non-volatile. Then, the storage node responds to the host. Further, asynchronously, data in the memory is destaged to a storage device. In the destaging, writing to the storage device is performed with data written to the storage system reflected. In the destaging, various storage functions such as thin provisioning and snapshot and data redundancy are provided and processing such as creating a logical-to-physical conversion address is performed to enable data search or random access. On the other hand, log-format non-volatile device storage is for restoration in the case of intra-memory data loss, and thus processing for storage is light and fast. Therefore, in the case of volatile memory use, response performance can be enhanced by quickly storing data in log format in a non-volatile storage device and sending a completion response to a host device.

During log-format storage, control information or data is stored in write-once format. Empty area collection is necessary for the write-once storage. The two methods of base image saving and garbage collection are selectively used for the empty area collection. By the base image saving method, a certain target area of control information or cache data is written in whole to a non-volatile device and every update log in that process is discarded (collected as an empty area). By the garbage collection method, log area collection is performed by identifying an unnecessary log that is not the latest among update logs and rewriting a log other than the unnecessary log to another area. In the event of a power failure, control information or cache data is restored to the memory using the base image saving and log, and thus loss does not occur. By performing empty area collection selectively using both methods, management information for empty area management can be reduced, overhead for empty area collection can be reduced, and storage performance can be improved.

In addition, data stored in the storage device in log format is made redundant by the plurality of storage nodes. Therefore, even in the event of a failure in the storage device of one of the storage nodes, control information or cache data can be recovered from the storage device of another storage node. Further, by synchronizing the memory states of the storage nodes, the data of the storage device can be recovered from the memory of the own node.

Example 1

FIG. 1 is an explanatory diagram regarding control information saving. First, the storage node includes a storage controller 1083, a volatile memory 1032, and a non-volatile storage device 1033. The memory 1032 stores control information and a log buffer of the control information. The storage device includes base image storage area #0 as a first base image storage area, base image storage area #1 as a second base image storage area, control information log storage area #0 as a first log storage area, and control information log storage area #0 as a second log storage area.

The base image storage area #0 and the base image storage area #1 are capable of storing the entire control information of the memory 1032 as a base image. The control information log storage area #0 and control information log storage area #1 are capable of storing update content of the control information, that is, the content of the control information log buffer.

The storage controller 1083 prepares two or more storage area planes and performs alternate base image saving there in order to always leave a saving-completed base image in the storage device 1033 (1). In the example illustrated in FIG. 1, two base image storage area planes and two log saving area planes are prepared and respectively associated.

The storage controller 1083 performs log saving processing as a normal operation during operation. Specifically, the base image saving is performed in one of the two planes (base image storage area #0 and base image storage area #1) (2-1).

In addition, the storage controller 1083 stores update content with respect to the control information as a log in a log storage area corresponding to a base image saving plane. At this time, the logs are stored in order from the head of the storage area (2-2).

When the base image saving is complete and the corresponding log storage area is nearly full, the storage controller 1083 performs "plane switching" (3-1). In the plane switching, the saving-completed plane (base image storage area #0 in the drawing) is a confirmed plane. In addition, the old base image (base image stored in the base image storage area #1 in the drawing) is discarded and initialized, and a new base image is saved (3-2).

During the plane switching, regarding the log, the storage controller 1083 simultaneously invalidates the entire log storage area preceding confirmed base image saving start and saves a new log (4).

FIG. 2 is an explanatory diagram of recovery processing following control information loss.

The control information of the volatile memory 1032 is lost in the event of power loss or the like. When the control information is lost from the memory 1032, the storage controller performs the recovery processing to read the confirmed base image and log out of the storage device 1033 and apply the image and log to the memory 1032.

Illustrated in FIG. 2 are recovery procedure Steps. 1 to 3 in a case where base image saving to the base image storage area #0 is complete, the plane switching is subsequently performed with the log of log saving area #0 full, and a power failure has occurred during base image saving to the base image storage area #1.

Step. 1 Apply the base image (#0) that was the confirmed plane in the event of the power failure.

Step. 2 Apply the log of the log storage area (#0) of the confirmed plane.

Step. 3 Apply the log of another log storage area (#1).

As a result of this procedure, the storage controller 1083 recovers (without rollback) the state of the control information area at the occurrence of the power failure.

Figure 3:
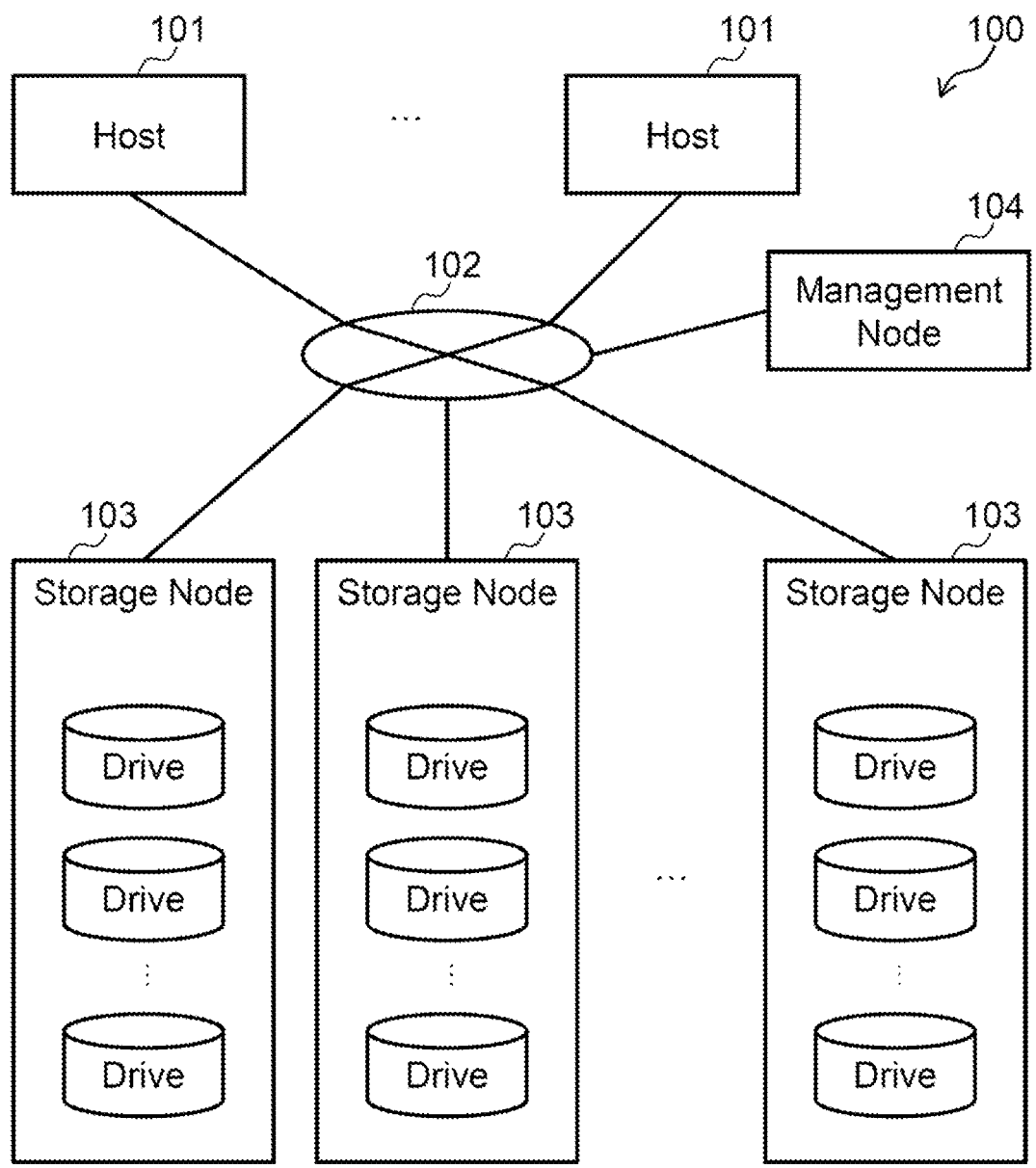
FIG. 3 is a configuration diagram of a storage system of Example 1.

FIG. 3 is a configuration diagram of the storage system of Example 1.

A storage system 100 includes, for example, a plurality of host devices 101 (hosts), a plurality of storage nodes 103, and a management node 104. The host device 101, the storage node 103, and the management node 104 are interconnected via a network 102 configured from fibre channel, Ethernet (registered trademark), local area network (LAN), or the like.

The host device 101 is a general-purpose computer device and transmits a read request or a write request (hereinafter, these will be collectively referred to as an input/output (I/O) request as appropriate) to the storage node 103 in response to a user operation or a request from an installed application program or the like. It should be noted that the host device 101 may be a virtual computer device such as a virtual machine.

The storage node 103 is a computer device and provides the host device 101 with a storage area for data reading and writing. The storage node 103 is, for example, a general-purpose server device.

The management node 104 is a computer device that a system administrator uses in order to manage the storage system 100 as a whole. The management node 104 manages the plurality of storage nodes 103 as a group called a cluster. It should be noted that although only one cluster is provided in the example illustrated in FIG. 1, a plurality of clusters may be provided in the storage system 100.

In this manner, the storage system 100 is configured with at least one storage node 103, at least one host device 101, and one management node 104. The illustrated configuration is an example, and the host device 101, the storage node 103, and the management node 104 may be the same node. In addition, it may be implemented with a virtual machine or a container or may be configured to coexist as a process in one machine. In addition, the net frame may be made redundant or may be separated into a network for management and a network for storage.

Figure 4:
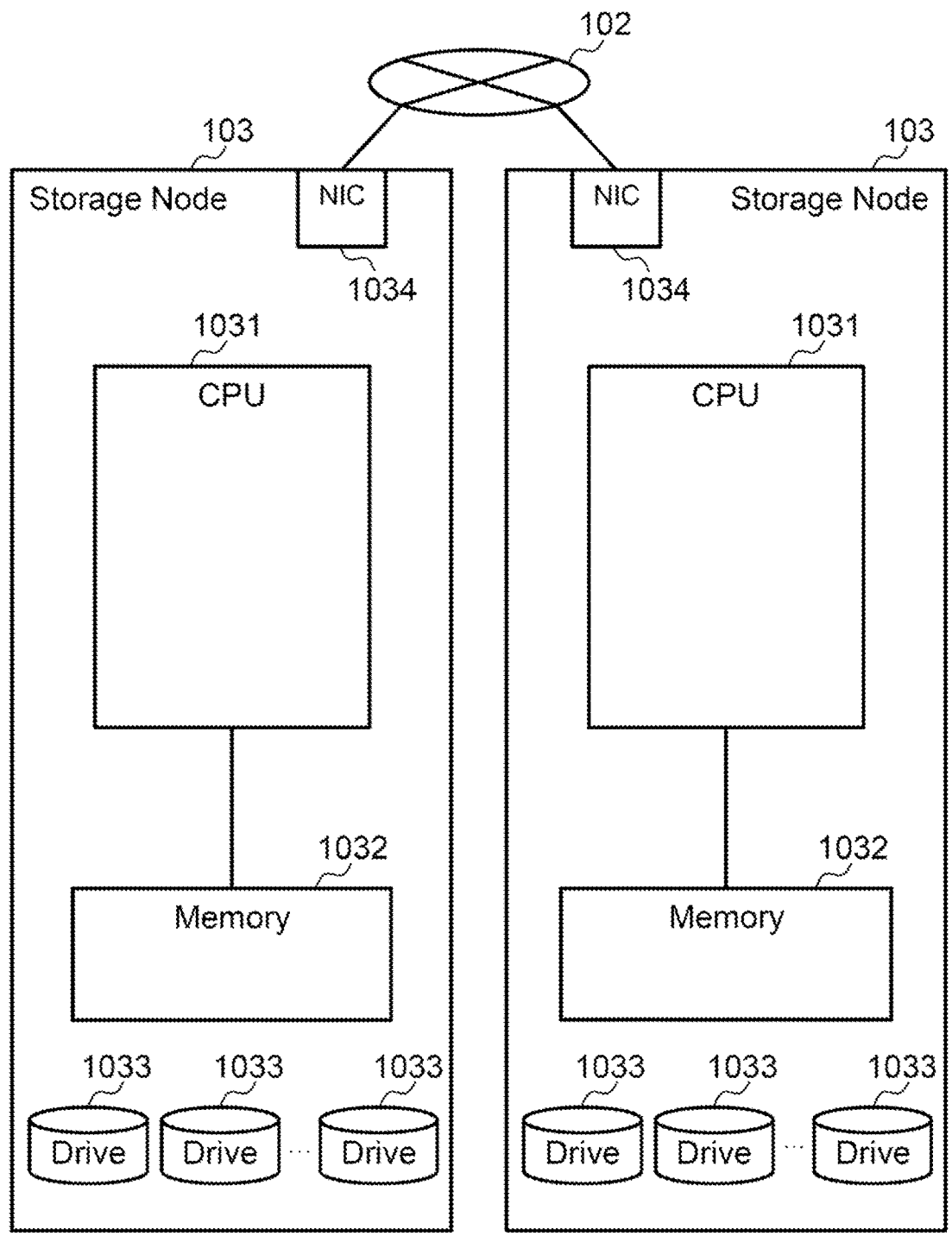
FIG. 4 is a diagram illustrating an example of a physical configuration of a storage node.

FIG. 4 is a diagram illustrating an example of a physical configuration of the storage node 103.

The storage node 103 includes a central processing unit (CPU) 1031, the memory 1032, a plurality of the storage devices 1033 (drives), and a communication device 1034 (network interface card (NIC)).

The CPU 1031 is a processor that controls the operation of the entire storage node. The memory 1032 is configured from a semiconductor memory such as a static random access memory (SRAM) and a dynamic random access memory (DRAM). The memory 1032 is used to temporarily retain various programs and necessary data. By the CPU 1031 executing the programs stored in the volatile memory 1032, various types of processing are executed as the storage node 103 as a whole as will be described later.

The storage device 1033 is configured from one or more types of large-capacity and non-volatile storage devices such as a solid state drive (SSD), a serial attached small computer system interface (SAS) hard disk drive, and a serial advanced technology attachment (SATA) hard disk drive. The storage device 1033 provides a physical storage area for reading or writing data in response to an I/O request from the host device 101.

The communication device 1034 is an interface for the storage node 103 to communicate with the host device 101, another storage node 103, or the management node 104 via the network 102. The communication device 1034 is configured from, for example, a NIC, an FC card, or the like. The communication device 1034 performs protocol control during communication with the host device 101, another storage node 103, or the management node 104.

Figure 5:
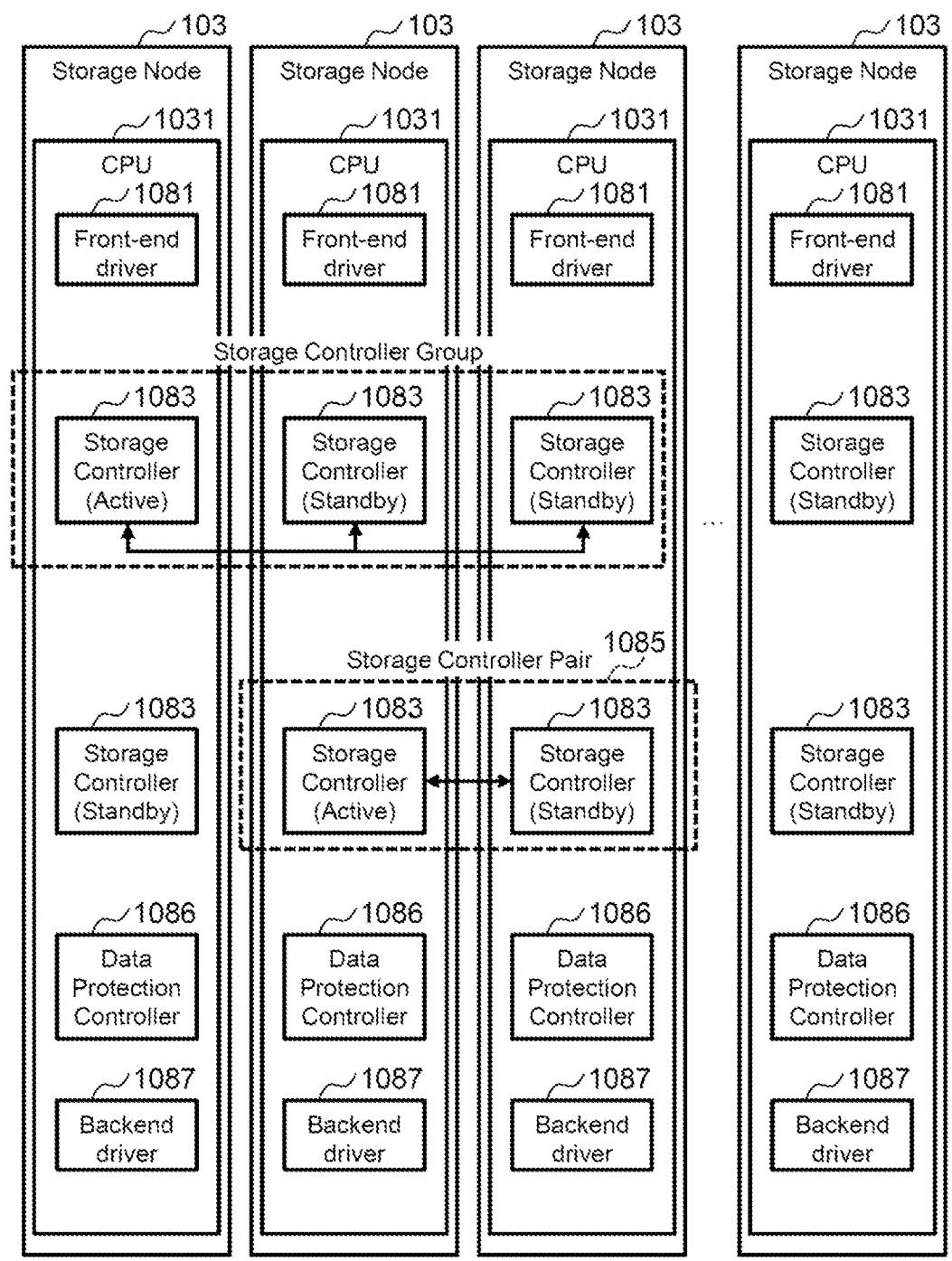
FIG. 5 is a diagram illustrating an example of a logical configuration of the storage node.

FIG. 5 is a diagram illustrating an example of a logical configuration of the storage node 103.

The storage node 103 includes a front-end driver 1081, a backend driver 1087, one or more storage controllers 1083, and a data protection controller 1086.

The front-end driver 1081, which is software, has a function of controlling the communication device 1034 and providing the CPU 1031 with an abstracted interface during communication with the host device 101, another storage node 103, or the management node 104 with respect to the storage controller 1083.

The backend driver 1087, which is software, has a function of controlling each storage device 1033 in the own storage node 103 and providing the CPU 1031 with an abstracted interface during communication with each storage device 1033.

The storage controller 1083 is software that functions as an SDS controller. The storage controller 1083 receives an I/O request from the host device 101 and issues an I/O command corresponding to the I/O request to the data protection controller 1086. In addition, the storage controller 1083 has a logical volume configuration function. The logical volume configuration function associates a logical chunk configured by the data protection controller with a logical volume provided to the host. Those that may be adopted as examples include a straight mapping method (logical chunk and logical volume being associated on a one-to-one basis and having the same address) and a virtual volume function (thin provisioning) method (logical volume and logical chunk being divided into small-sized areas (pages) and logical volume and logical chunk addresses being associated page by page).

In the case of Example 1, each storage controller 1083 implemented in the storage node 103 is managed as a storage controller group 1085 that configures a redundant configuration together with another storage controller 1083 disposed in a different storage node 103. In a case where two storage nodes 103 belong to the storage controller group 1085, the two can also be called a storage controller pair.

In the storage controller group 1085, one storage controller 1083 is set to a state where an I/O request from the host device 101 can be received (current system state to be referred to as active mode hereinafter). In addition, in the storage controller group 1085, another storage controller 1083 is set to a state where an I/O request from the host device 101 is not received (standby system state to be referred to as a standby mode hereinafter). It should be noted that a node in the active mode will be called an active node and a node in the standby mode will be called a standby node.

Further, in the storage controller group 1085, in the event of, for example, a failure in the storage controller 1083 set to the active mode (hereinafter, referred to as an active storage controller) or the storage node 103 where the active storage controller is disposed, the state of the storage controller 1083 in the standby mode at that time (hereinafter, referred to as a standby storage controller) is switched to the active mode. As a result, in a case where the active storage controller becomes inoperable, the I/O processing in the process of execution by the active storage controller can be taken over by the standby storage controller.

The data protection controller 1086, which is software, has a function of allocating a physical storage area provided by the storage device 1033 in the own storage node 103 or another storage node 103 with respect to each storage controller group 1085 and reading or writing designated data to the corresponding storage device 1033 in accordance with the above I/O command given from the storage controller 1083.

In this case, when a physical storage area provided by the storage device 1033 in another storage node 103 is allocated with respect to the storage controller group 1085, the data protection controller 1086 cooperates with the data protection controller 1086 implemented in the other storage node 103 and exchanges data with the data protection controller 1086 via the network 102. As a result, the data protection controller 1086 reads or writes the data to the storage area in accordance with the I/O command given from the active storage controller of the storage controller group 1085.

Figure 6:
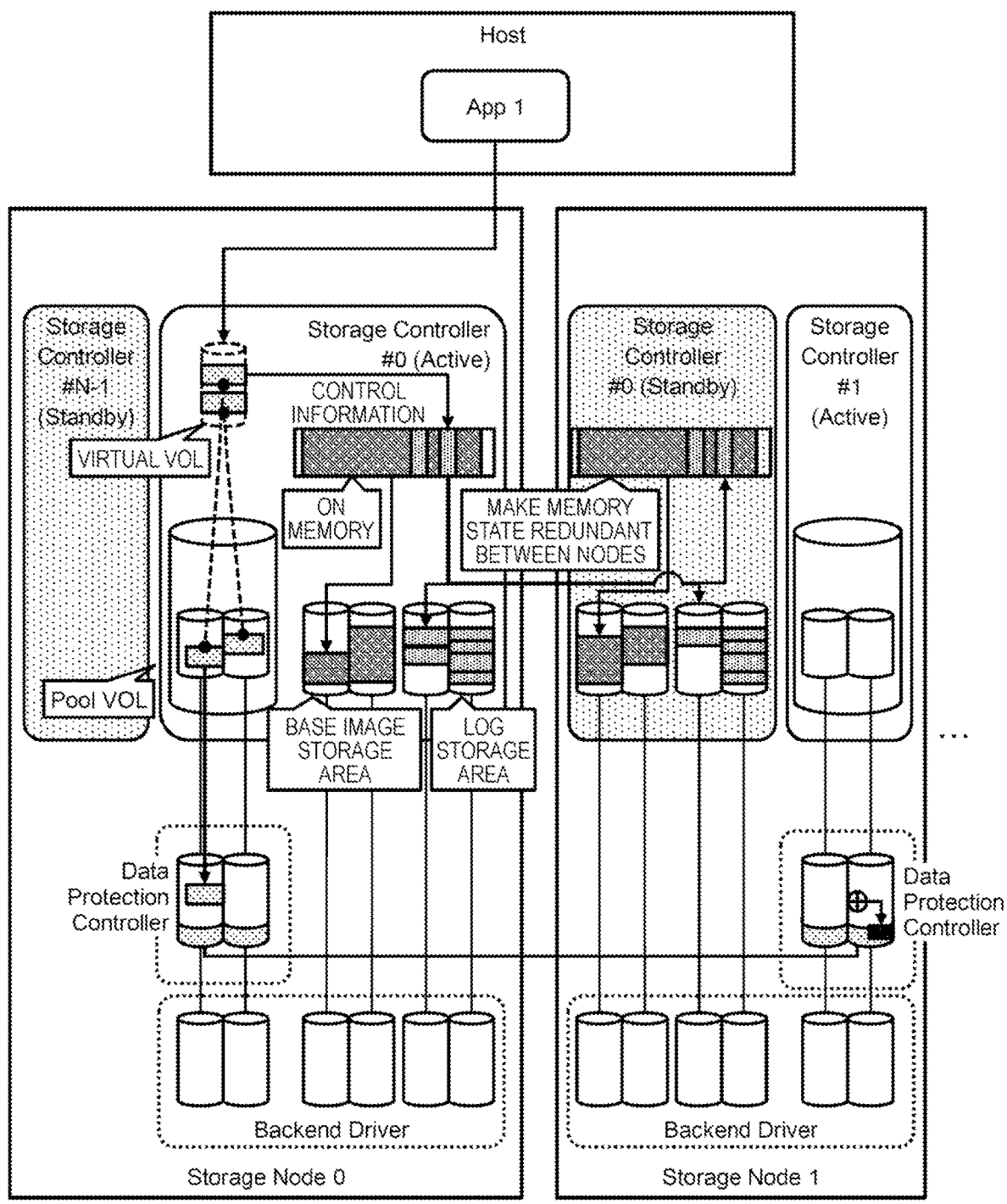
FIG. 6 is a diagram illustrating an example of a logical configuration of the storage system.

FIG. 6 is a diagram illustrating an example of a logical configuration of the storage system.

The storage controller 1083 uses the storage area (pool volume) provided by the data protection controller to provide the host with a virtual storage area (virtual volume) (so-called thin provisioning method). In an active process, when write is received from the host to a certain page of the virtual volume, the storage controller 1083 allocates the page of the pool volume.

The storage controller 1083 uses the storage area provided by the backend driver as a base image storage area and a log storage area for control information.

After the mapping information of the pool volume to the virtual volume or the like is written to the control information area on the memory, update content is logged and saved in the log storage area. In addition, the update content is also applied to the control information area of the process in the standby state on the other node of the same pair and is also saved in the log storage area of the node.

The entire control information is saved in the storage area as a base image. Likewise, the base image is saved in the storage area in the process in the standby state that forms a pair.

Figure 7:
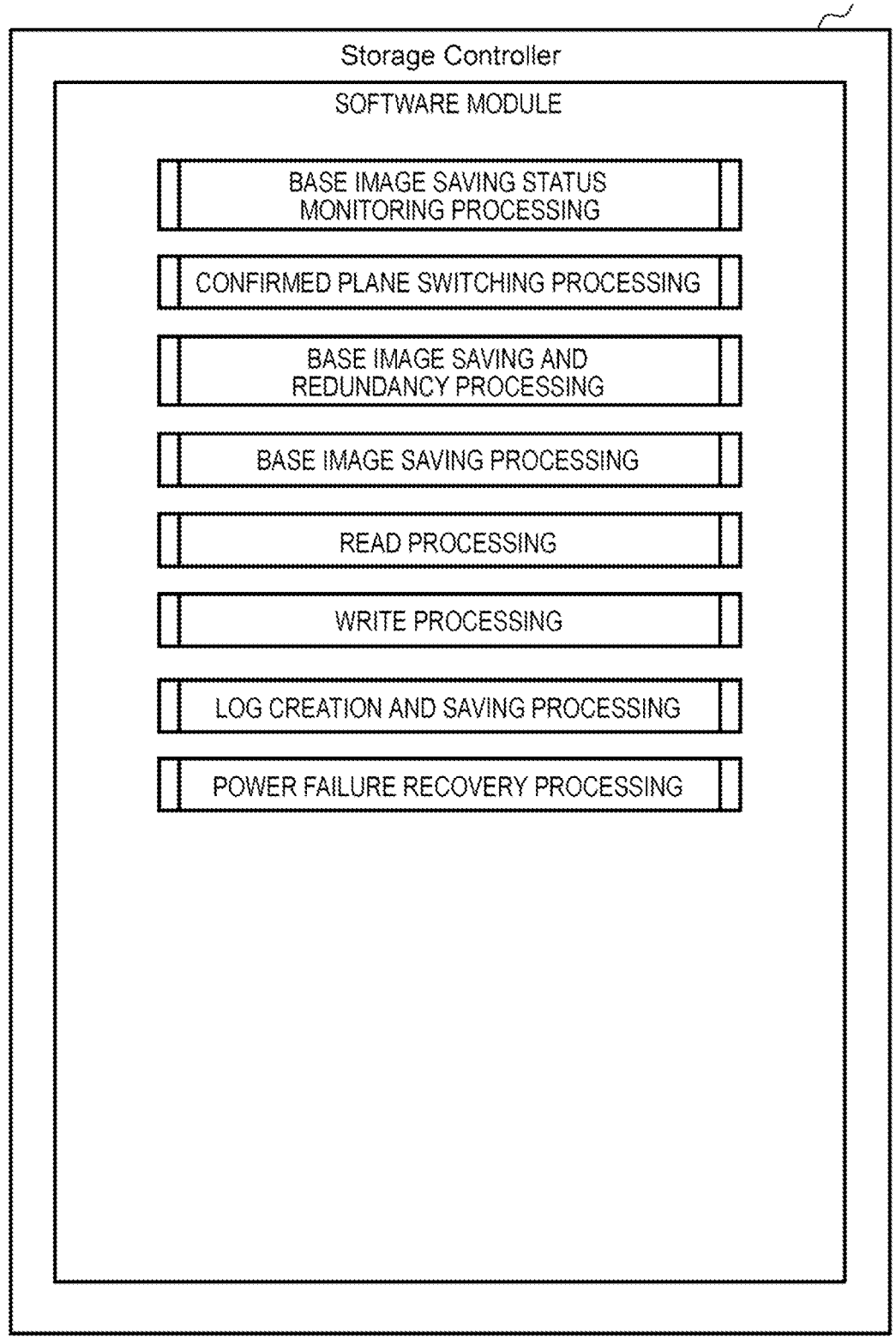
FIG. 7 is a diagram illustrating an example of a software module structure of a storage controller.

FIG. 7 is a diagram illustrating an example of a software module structure of the storage controller 1083.

The storage controller 1083 executes base image saving status monitoring processing, confirmed plane switching processing, base image saving and redundancy processing, base image saving processing, read processing, write processing, log creation and saving processing, and power failure recovery processing. Details of each processing will be described later.

Figure 8:
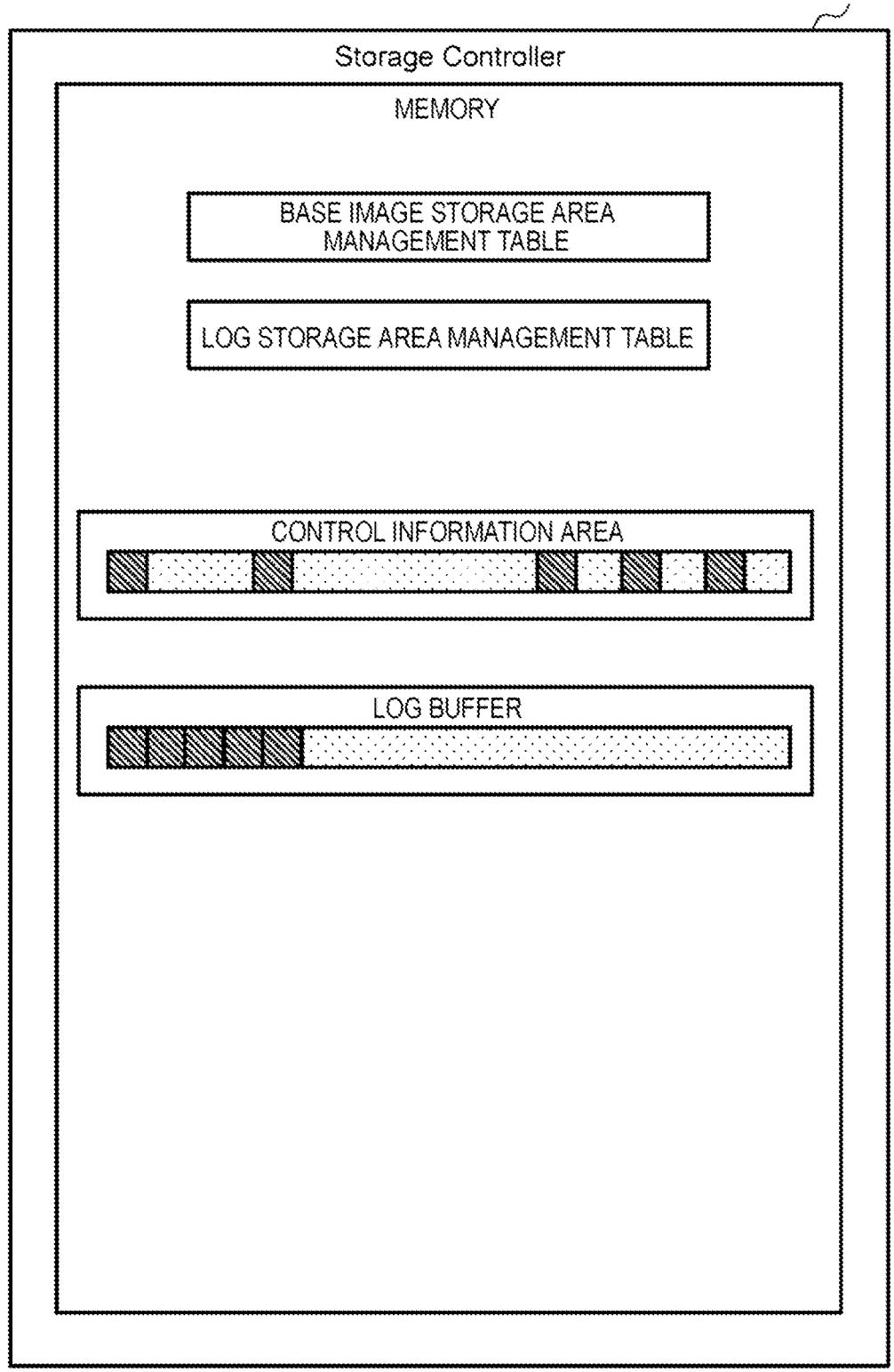
FIG. 8 is a specific example of data stored in a memory.

FIG. 8 is a specific example of data stored in the memory 1032. A base image storage area management table, a log storage area management table, a control information area, and a log buffer area are disposed in the memory areas respectively managed by the active process and the standby process of the storage controller 1083.

The control information area stores information such as page mapping information between the virtual and pool volumes of thin provisioning. A log created when the control information area is updated is temporarily stored in the log buffer and then written to the log storage area.

FIG. 9 is an explanatory diagram of the base image storage area management table. The base image storage area management table stores a confirmed plane ID for uniquely identifying a saving-completed plane (confirmed plane), a saving plane ID for uniquely identifying a plane where base image saving is performed (saving plane), and management information for each storage area. The management information of each storage area stores the progress of base image saving (saving rate). A saving rate of 100% indicates that base image storage is complete with respect to the storage area and the base image can be used for recovery. A saving rate of less than 100% indicates that processing is in the process of execution to store the base image using that storage area as a storage destination.

FIG. 10 is an explanatory diagram of the log storage area management table. The log storage area management table has management information for each storage area plane.

Log storage can be performed by preparing the same number of log storage areas as base image storage areas and associating #0 and #1 with each other. The log storage area management table in a case where this method is adopted has, for each of the plurality of log storage areas, the items of the head position address of the stored log (storage position of the first log), the end position address of the stored log (tail position of the last log), and the rate of use of the storage area.

Further, during base image saving in the base image storage area #0, control information update content starts to be written as a log from the head of log storage area #0. Then, the log end address of this table is updated after the log writing is completed.

The log storage may be performed by dividing the inside of one log storage area into areas for log storage areas #0 and #1 and associating the areas with base image storage areas #0 and #1, respectively. The log storage area management table in a case where this method is adopted has the items of the head position address and the end position address of the stored log for each of the plurality of log storage areas and also has the rate of use of the entire log storage area as an item.

In this method, the log end address on the saving plane side is updated after the log writing is completed. When the plane switching is performed, the head address of the storage area to newly become the saving side is set to the end address of the old saving plane side storage.

Figure 11:
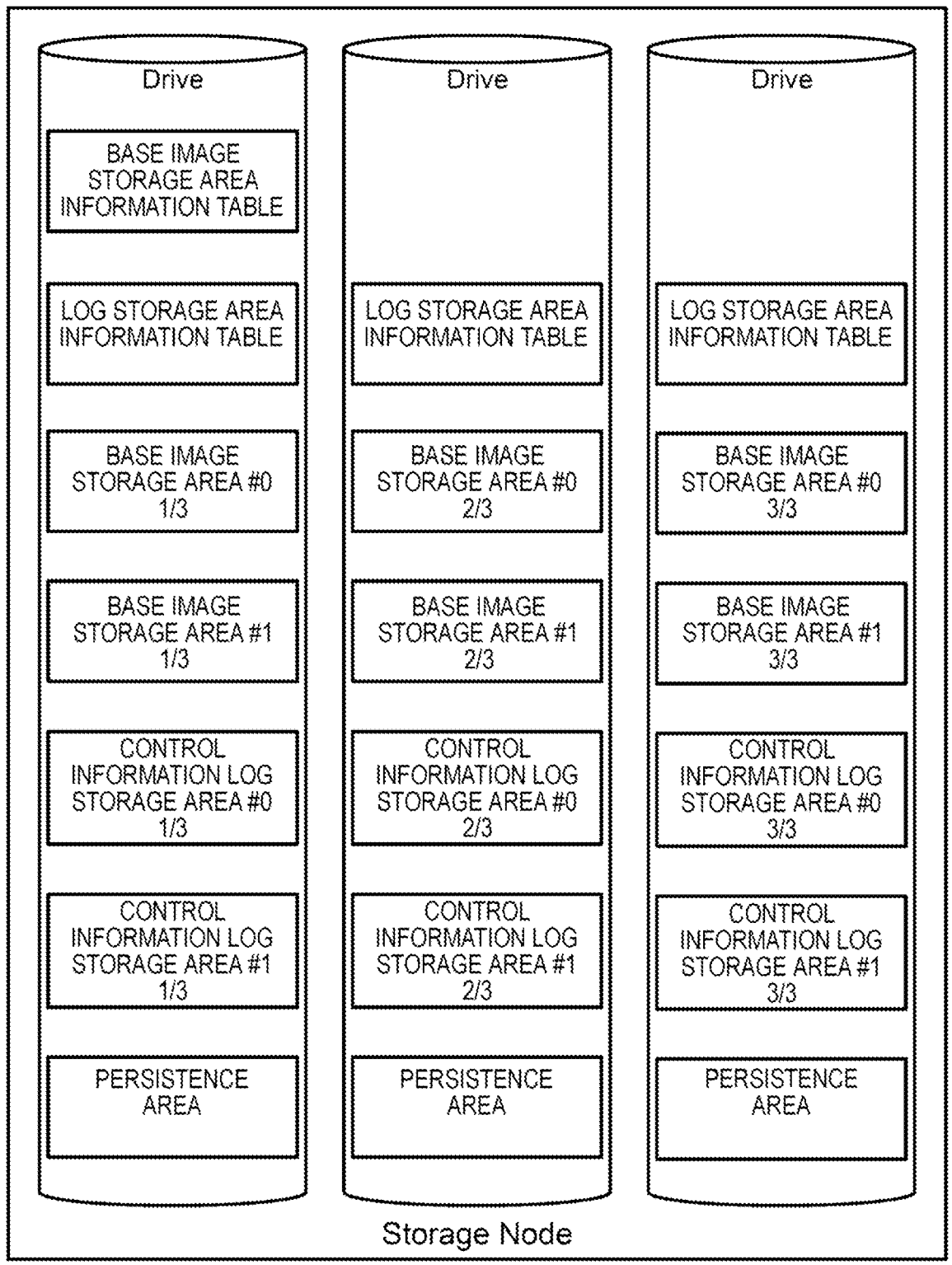
FIG. 11 is an explanatory diagram regarding storage device information.

FIG. 11 is an explanatory diagram regarding storage device information. For the process of each storage controller, a base image storage area information table, a log storage area information table, a base image storage area, a control information log storage area, and a persistence area are prepared on the storage device of the node.

In the example illustrated in FIG. 11, two base image storage area planes (#0 and #1) and two log storage area planes (#0 and #1) are prepared.

The base image storage area information table stores which of the two storage area planes is a confirmed plane.

The log storage area information table stores information on the area where a log is stored in the log storage area.

Each plane of the base image storage area and the log storage area may be divided into a plurality of storage devices and disposed. In the example illustrated in FIG. 11, it is divided into three storage devices and disposed.

User data is stored in the persistence area.

The division of the base image storage area may be performed on the backend driver side or may be performed on the storage controller side.

In the former case, the backend driver layer side performs distributed disposition in a plurality of drives of the base image received from the storage controller.

In the latter case, the storage controller layer side performs distributed disposition of the base image in a plurality of drives.

FIG. 12 is an explanatory diagram of the base image storage area information table.

The base image storage area information table stores the ID of a saving-completed plane and a sequence number for each storage area regarding the base image written to the storage device. These types of information are read out during the recovery processing.

FIG. 13 is an explanatory diagram of the log storage area information table written to the storage device.

The log storage area information table stores the range of saving of a valid log in the log storage area, which is read out by the recovery processing.

The head position address (storage position of the first log) and the end position address (tail position of the last log) of the stored log are stored in the management information of each storage area plane.

A log head position address and a log end position address are stored in association with the base image storage area both in preparing the same number of log storage areas as base image storage areas and in dividing one log storage area to be allocated to the base image storage area. However, in the division of one log storage area, the log end position address corresponding to one base image becomes the log head position address corresponding to the next base image.

FIG. 14 illustrates the structure of a log header. The log header is a table included in each log stored in a log buffer area on the memory or a log area on the storage device.

The log header is added to the head of a log during log creation from update content in updating control information.

The log header has fields such as log sequence number, update address, and update size.

A log sequence number uniquely assigned to each log is stored in the log sequence number field. The update address field stores the address of update target control information or cache data of each log. The update size field stores the size of update.

Figure 15:
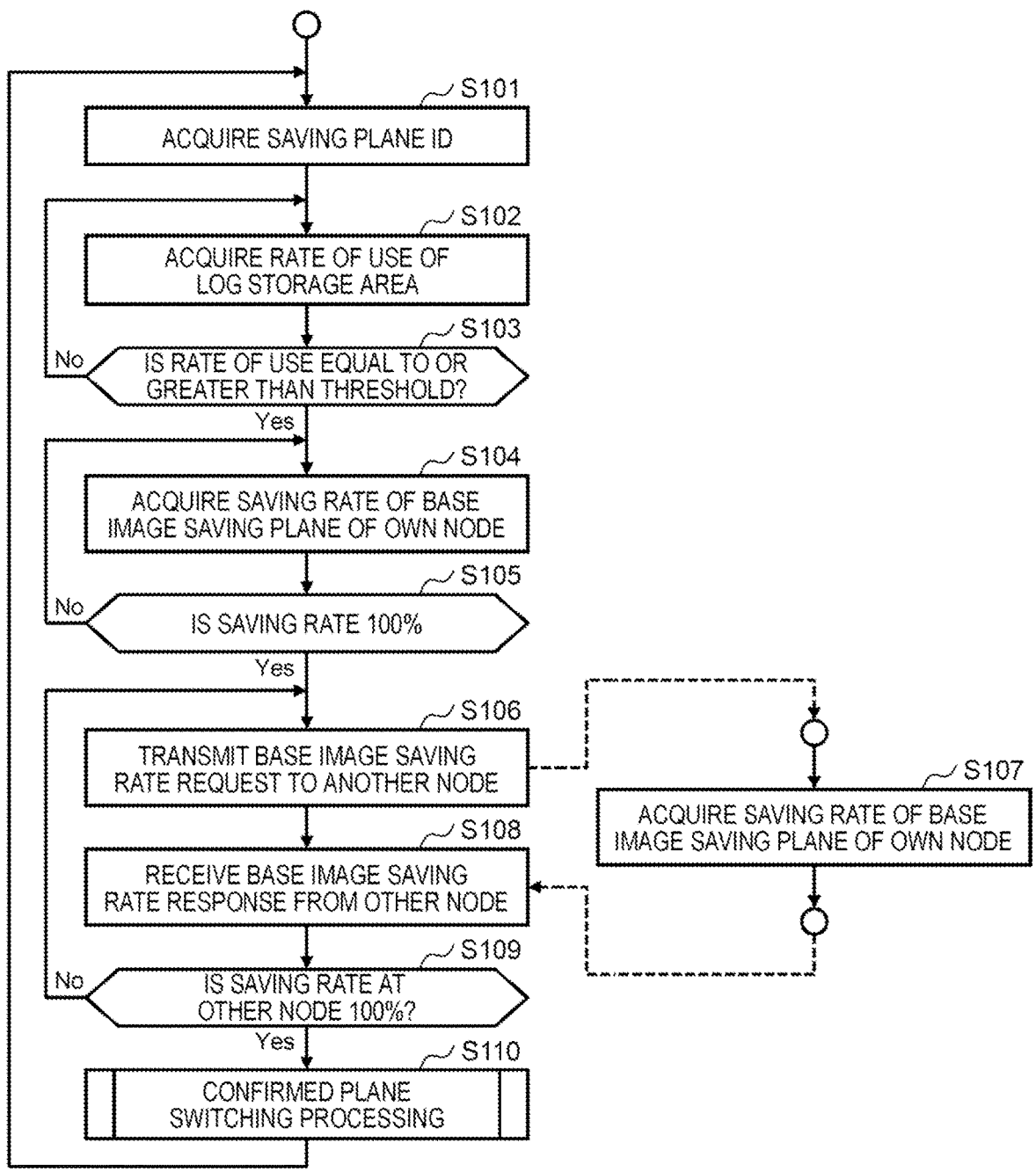
FIG. 15 is a flowchart illustrating the processing procedure of base image saving status monitoring processing.

FIG. 15 is a flowchart illustrating the processing procedure of the base image saving status monitoring processing.

In the base image saving status monitoring processing, the rate of use of the log storage area and the saving status of the base image saving plane are monitored and, in a case where the rate of use of the log storage area is high and the base image saving is complete, the confirmed plane switching processing is performed to start base image saving to another storage plane.

In the base image saving status monitoring processing, the base image saving status is monitored by every paired storage controller 1083 and the plane switching is performed in a case where every saving is complete.

Specifically, first, the active storage controller 1083 acquires a saving plane ID (step S101) and acquires the rate of use of a log storage area (step S102). The storage controller 1083 repeats step S102 if the rate of use of the log storage area is less than a threshold (step S103; No).

If the rate of use of the log storage area is equal to or greater than the threshold (step S103; Yes), the storage controller 1083 acquires the saving rate of the base image saving plane of the own node (step S104). The storage controller 1083 repeats step S104 if the saving rate of the base image saving plane is less than 100% (step S105; No).

If the saving rate of the base image saving plane is 100% (step S105; Yes), the storage controller 1083 transmits a base image saving rate request to another node (here, the standby storage controller 1083) (step S106). Upon receiving the base image saving rate request, the storage controller 1083 of the other node acquires the saving rate of the base image saving plane in that node (step S107) and transmits a base image saving rate response to the requesting node (node of base image saving rate request transmission).

Upon receiving the base image saving rate response (step S108), the storage controller 1083 of the node of base image saving rate request transmission determines whether or not the saving rate in the other node is 100% (step S109). The processing returns to step S106 if the saving rate in the other node is less than 100% (step S109; No). If the saving rate in the other node is 100% (step S109; Yes), the storage controller 1083 performs the confirmed plane switching processing (step S110) and returns to step S101.

Figure 16:
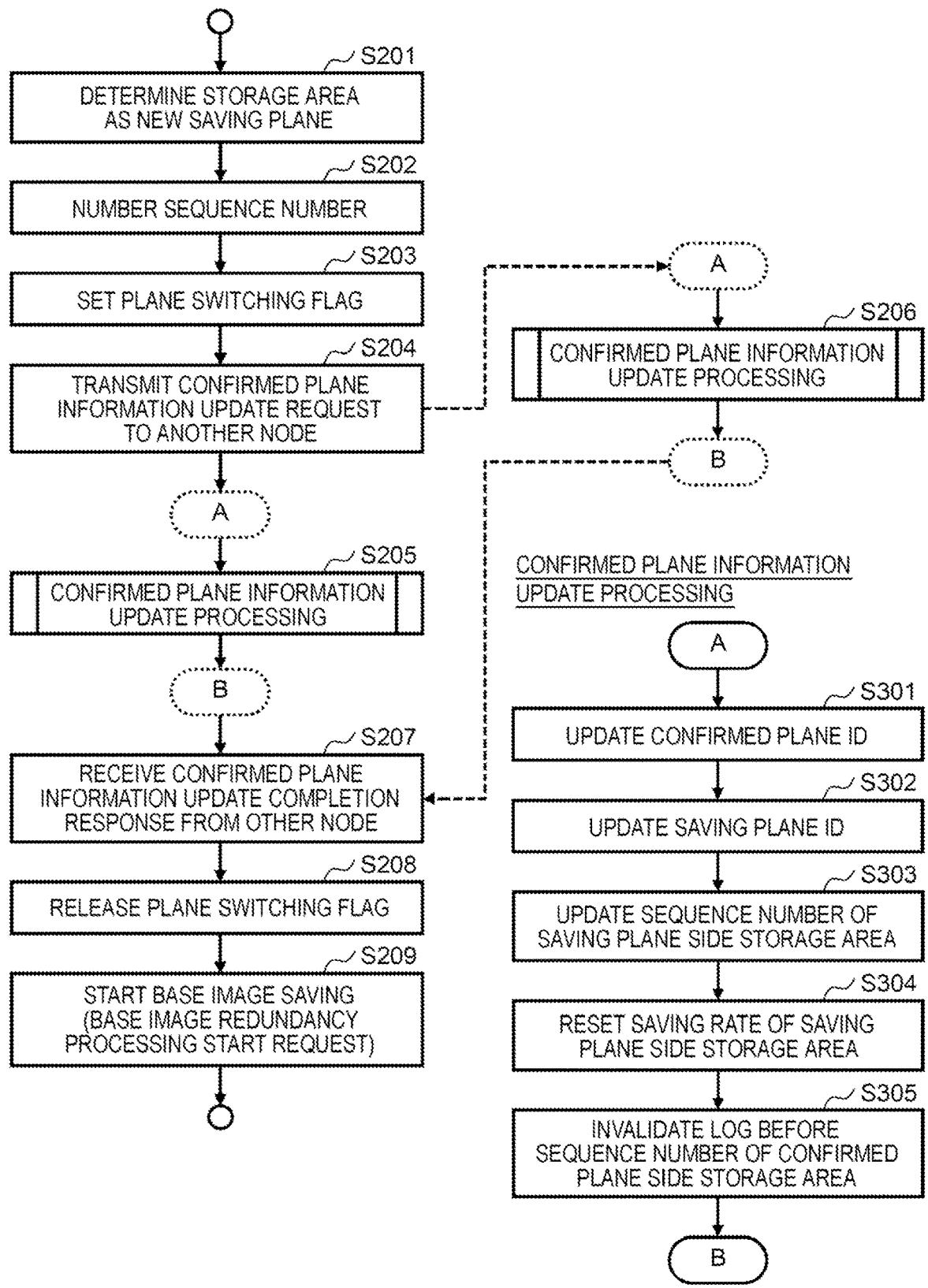
FIG. 16 is a flowchart illustrating the processing procedure of confirmed plane switching processing (two-plane method)

FIG. 16 is a flowchart illustrating the processing procedure of the confirmed plane switching processing (two-plane method).

In the confirmed plane switching processing by the two-plane method, the storage controller 1083 with two base image storage areas switches the storage area of base image saving. In the confirmed plane switching processing, the storage controller 1083 updates information in the base image storage area management table on the memory and the base image storage area information table on the storage device.

The confirmed plane switching processing updates information at a node where the active process and the standby process operate. In addition, a flag is set and the log creation processing to be described later is stopped during the confirmed plane switching.

Specifically, the storage controller 1083 first determines a storage area as a new saving plane (step S201). It should be noted that the storage areas in the two-plane method are selected alternately.

Next, the storage controller 1083 numbers a log sequence number set to a base image to be newly saved (step S202) and sets a plane switching flag (step S203). Log creation is stopped during the plane switching flag setting.

After that, the storage controller 1083 transmits a confirmed plane information update request to another node (step S204). Each of the storage controller 1083 of the node that has transmitted the confirmed plane information update request and the storage controller 1083 of the node that has received the confirmed plane information update request executes confirmed plane information update processing. In FIG. 16, step S205 indicates the confirmed plane information update processing of the node that has transmitted the confirmed plane information update request, and step S206 indicates the confirmed plane information update processing of the node that has received the confirmed plane information update request.

After the confirmed plane information update processing, the storage controller 1083 of the node that has transmitted the confirmed plane information update request receives a confirmed plane information update completion response from the other node (step S207), releases the plane switching flag (step S208), and starts base image saving (step S209). Step S209 includes a request to start base image redundancy processing.

In the confirmed plane information update processing, the storage controller 1083 first updates the confirmed plane ID (step S301). Specifically, the confirmed plane IDs of the base image storage area management table on the memory and the base image storage area information table on the storage device are updated. In addition, the storage controller 1083 updates the saving plane ID of the base image storage area management table on the memory (step S302).

After that, the storage controller 1083 updates the sequence number of the saving plane storage area (step S303). Specifically, the storage controller 1083 updates the saving plane side sequence number of the base image storage area information table on the storage device to the numbered value.

After step S303, the storage controller 1083 resets the saving rate of the saving plane side storage area (step S304). Specifically, the saving rate on the saving plane side of the base image storage area management table on the memory is reset to zero.

After step S304, the storage controller 1083 invalidates the log before the sequence number of the confirmed plane side storage area (step S305). In the method in which the same number of log storage area and base image storage area are prepared, the log end side address of the new saving plane side of the log storage area management table on the memory and the log storage area information table on the storage device is corrected to the head address. In the method in which only one log storage area is prepared, the tip and end addresses of the new saving plane side of the log storage area management table on the memory and the log storage area information table on the storage device are aligned with the end address of the confirmed plane side.

Figure 17:
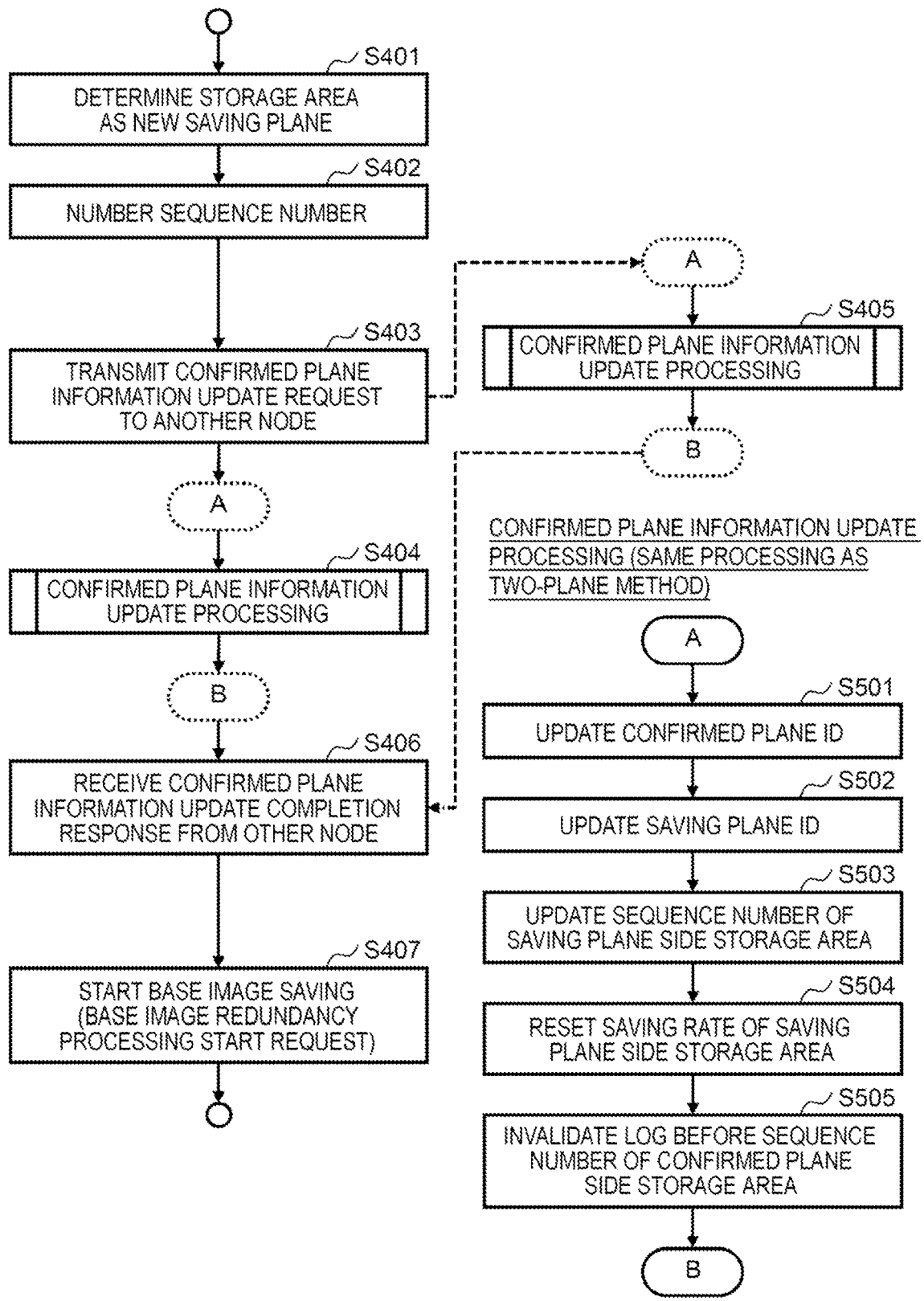
FIG. 17 is a flowchart illustrating the processing procedure of confirmed plane switching processing (three-plane method)

FIG. 17 is a flowchart illustrating the processing procedure of the confirmed plane switching processing (three-plane method).

In the confirmed plane switching processing by the three-plane method, the storage controller 1083 with three base image storage areas switches the storage area of base image saving. In the confirmed plane switching processing by the three-plane method, log creation does not have to be stopped even during the confirmed plane switching.

Specifically, the storage controller 1083 first determines a storage area as a new saving plane (step S401). It should be noted that in the three-plane method, selection is made in the order of, for example, #0, #1, #2, #0, . . .

Next, the storage controller 1083 numbers a log sequence number set to a base image to be newly saved (step S402) and transmits a confirmed plane information update request to another node (step S403). Each of the storage controller 1083 of the node that has transmitted the confirmed plane information update request and the storage controller 1083 of the node that has received the confirmed plane information update request executes confirmed plane information update processing. In FIG. 17, step S404 indicates the confirmed plane information update processing of the node that has transmitted the confirmed plane information update request, and step S405 indicates the confirmed plane information update processing of the node that has received the confirmed plane information update request.

After the confirmed plane information update processing, the storage controller 1083 of the node that has transmitted the confirmed plane information update request receives a confirmed plane information update completion response from the other node (step S406) and starts base image saving (step S407). Step S407 includes a request to start base image redundancy processing.

In FIG. 17, details of the confirmed plane information update processing are illustrated as steps S501 to S505, but these processes are the same as steps S301 to S305 in FIG. 16 and thus description thereof is omitted.

Figure 18:
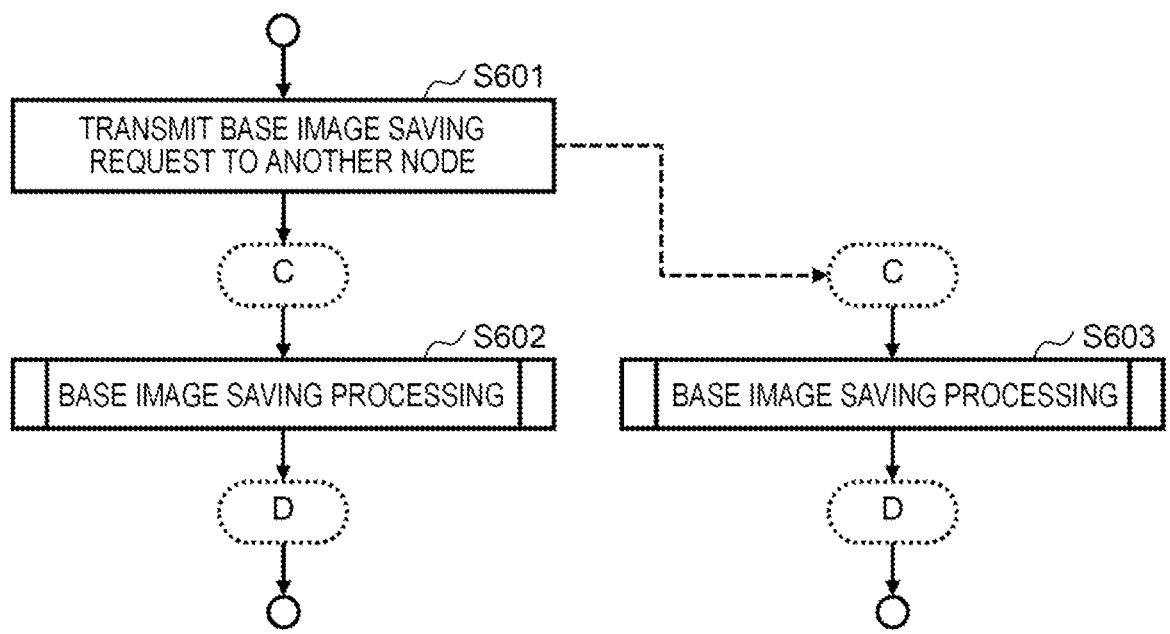
FIG. 18 is a flowchart of base image saving and redundancy processing (first)
Figure 19:
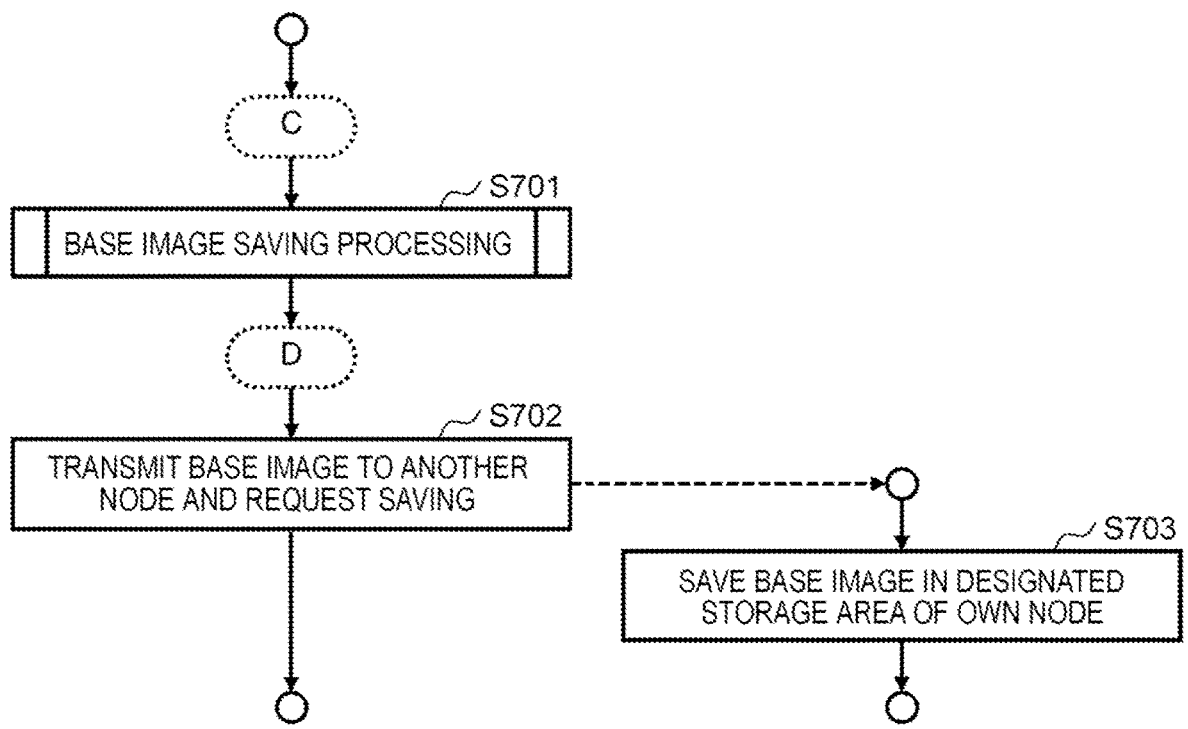
FIG. 19 is a flowchart of the base image saving and redundancy processing (second)

FIGS. 18 and 19 are flowcharts of the base image saving and redundancy processing.

FIG. 18 illustrates a method for autonomous base image saving in each node, and FIG. 19 illustrates a method for transferring to another node and storing a base image acquired by an active node.

In the method of FIG. 18, autonomous base image saving is performed in each process of the paired storage controller 1083. Specifically, for example, the storage controller 1083 of the active node requests the other node (standby node) of the same pair to save a base image (step S601) and executes base image saving processing in the own node as well (step S602). In addition, the other node that has received the base image saving request also executes base image saving processing (step S603).

In the method of FIG. 19, a base image acquired in one of the processes of the paired storage controller 1083 is transferred to the other process as well and saved. Specifically, for example, the storage controller 1083 of the active node executes base image saving processing (step S701). After that, the base image is transmitted to the other node (standby node) of the same pair, and saving is requested (step S702). The other node that has received the base image saves the received base image in a designated storage area of the own node (step S703).

Figure 20:
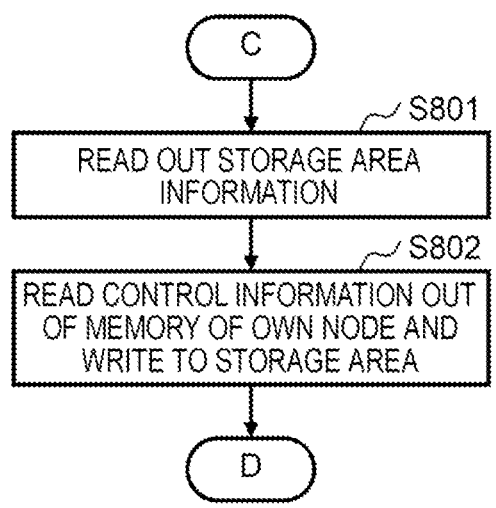
FIG. 20 is a flowchart of base image saving processing (first)
Figure 21:
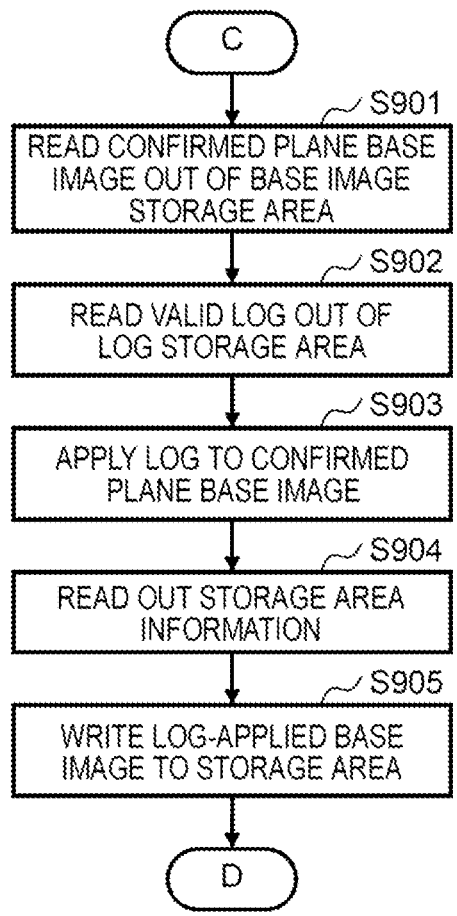
FIG. 21 is a flowchart of the base image saving processing (second)

FIGS. 20 and 21 are flowcharts of the base image saving processing.

FIG. 20 illustrates a method for reading data out of the memory and saving the data to a drive, and FIG. 21 illustrates a method for base image creation from existing saving information.

In the method of FIG. 20, the storage controller 1083 reads out the entire control information on the memory and saves the information in a storage area as a base image.

Specifically, the storage controller 1083 first reads out storage area information (step S801). In this step, the storage controller 1083 acquires a saving plane ID from the base image storage area management table on the memory.

After step S801, the storage controller 1083 reads out control information from the memory of the own node and writes the information to a storage area (step S802).

In the method of FIG. 21, the storage controller 1083 applies the log of a corresponding log storage area to the base image on the saving-completed confirmed plane side to obtain a base image in the state of control information at the time of plane switching.

Specifically, the storage controller 1083 first reads a confirmed plane base image out of the base image storage area (step S901). As a result, it is possible to acquire the confirmed plane side base image on the storage device.

Next, the storage controller 1083 reads a valid log out of the log storage area (step S902). As a result, it is possible to acquire the confirmed plane side log on the storage device.

Next, the storage controller 1083 applies the log to the confirmed plane base image (step S903). As a result, it is possible to obtain a base image of control information at the time of plane switching by applying the log to the base image.

After that, the storage controller 1083 reads out storage area information (step S904) and writes the log-applied base image to the storage area (step S905).

Figure 22:
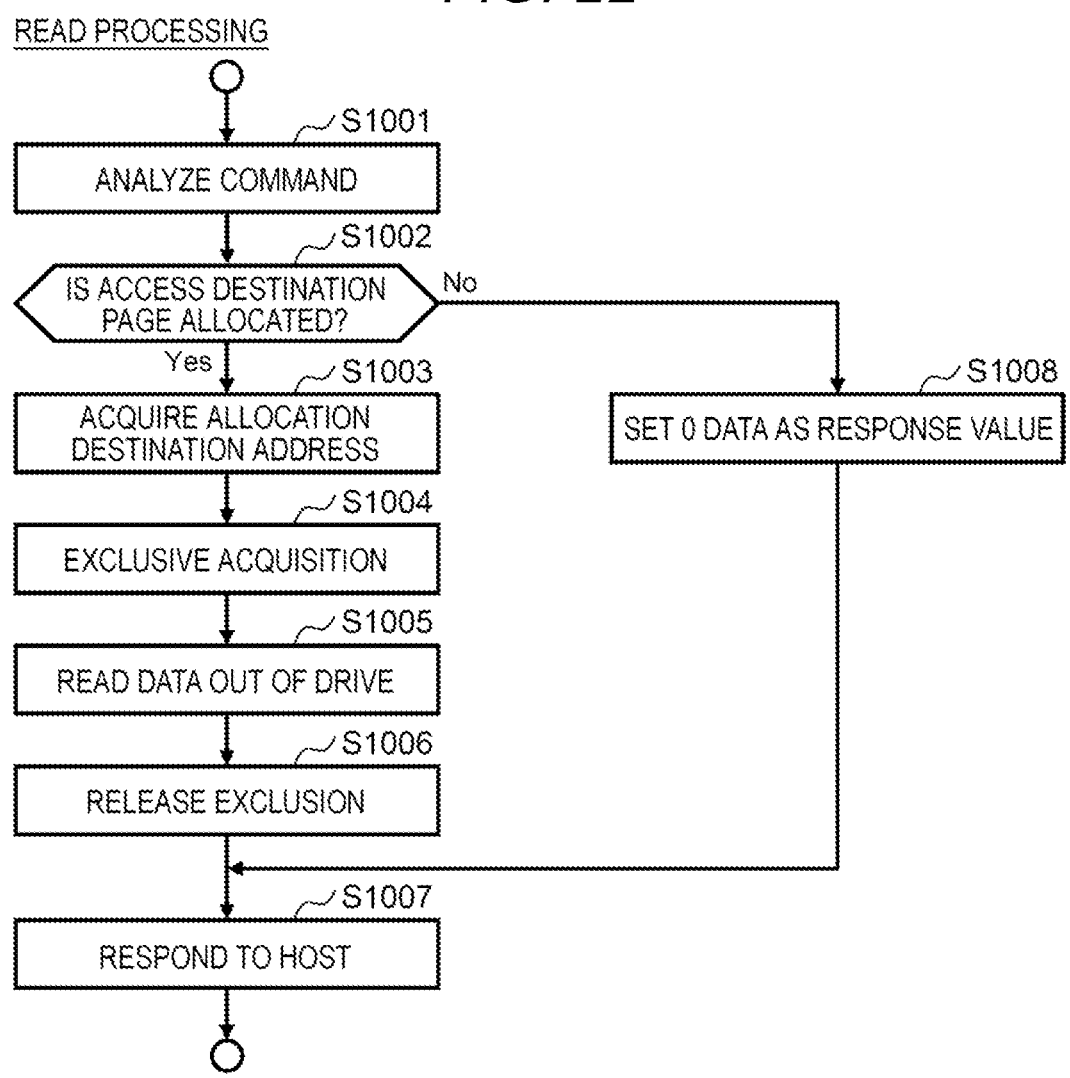
FIG. 22 is a flowchart of read processing.

FIG. 22 is a flowchart of the read processing. Illustrated here is processing in a case where a virtual volume provided by the storage controller 1083 has read.

First, the storage controller 1083 analyzes the command (step S1001) and determines whether or not the access destination is page-allocated (step S1002). If the access destination is not page-allocated (step S1002; No), 0 data is set as the response value (step S1008), the host is responded to (step S1007), and the processing ends.

If the access destination is page-allocated (step S1002; Yes), the storage controller 1083 acquires the allocation destination address (step S1003) and performs exclusive acquisition (step S1004). Then, data is read out of the drive (step S1005), the exclusion is released (step S1006), the host is responded to (step S1007), and the processing ends.

Figure 23:
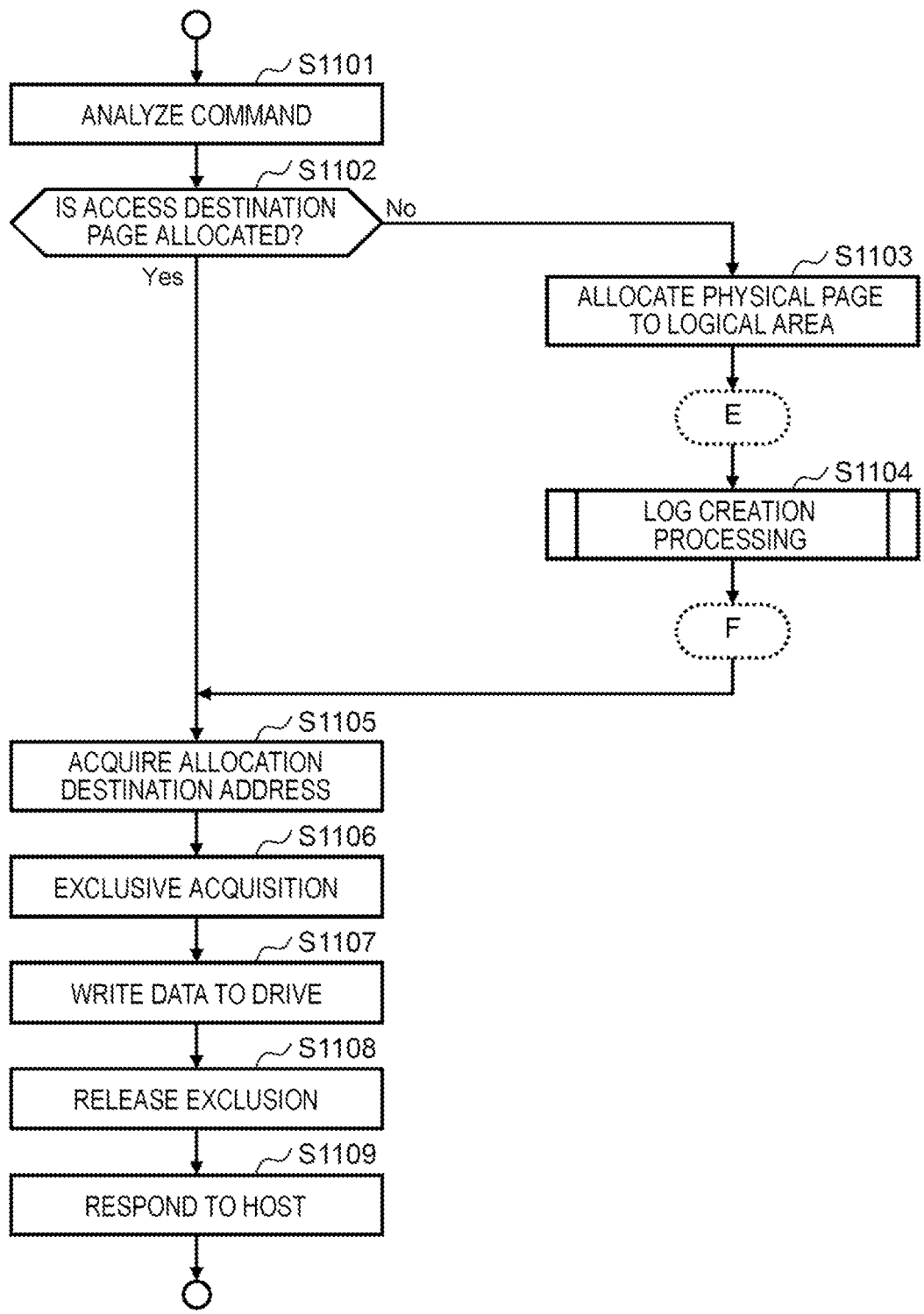
FIG. 23 is a flowchart of write processing.

FIG. 23 is a flowchart of the write processing. Illustrated here is processing in a case where a virtual volume provided by the storage controller 1083 has write. The processing is performed in the active process that is in an IO-receiving state in the pair of storage controllers. In addition, in a case where the page of the pool volume is not allocated to the page of the write destination virtual volume, pool volume page allocation processing is performed and then the mapping information is logged and saved to the drive.

First, the storage controller 1083 analyzes the command (step S1101) and determines whether or not the access destination is page-allocated (step S1102). If the access destination is not page-allocated (step S1102; No), a physical page is allocated to the logical area (step S1103) and log creation processing is executed (step S1104).

After the log creation processing or in a case where the access destination is page-allocated (step S1102; Yes), the storage controller 1083 acquires the allocation destination address (step S1105) and performs exclusive acquisition (step S1106). Then, data is written to the drive (step S1107), the exclusion is released (step S1108), the host is responded to (step S1109), and the processing ends.

Figure 24:
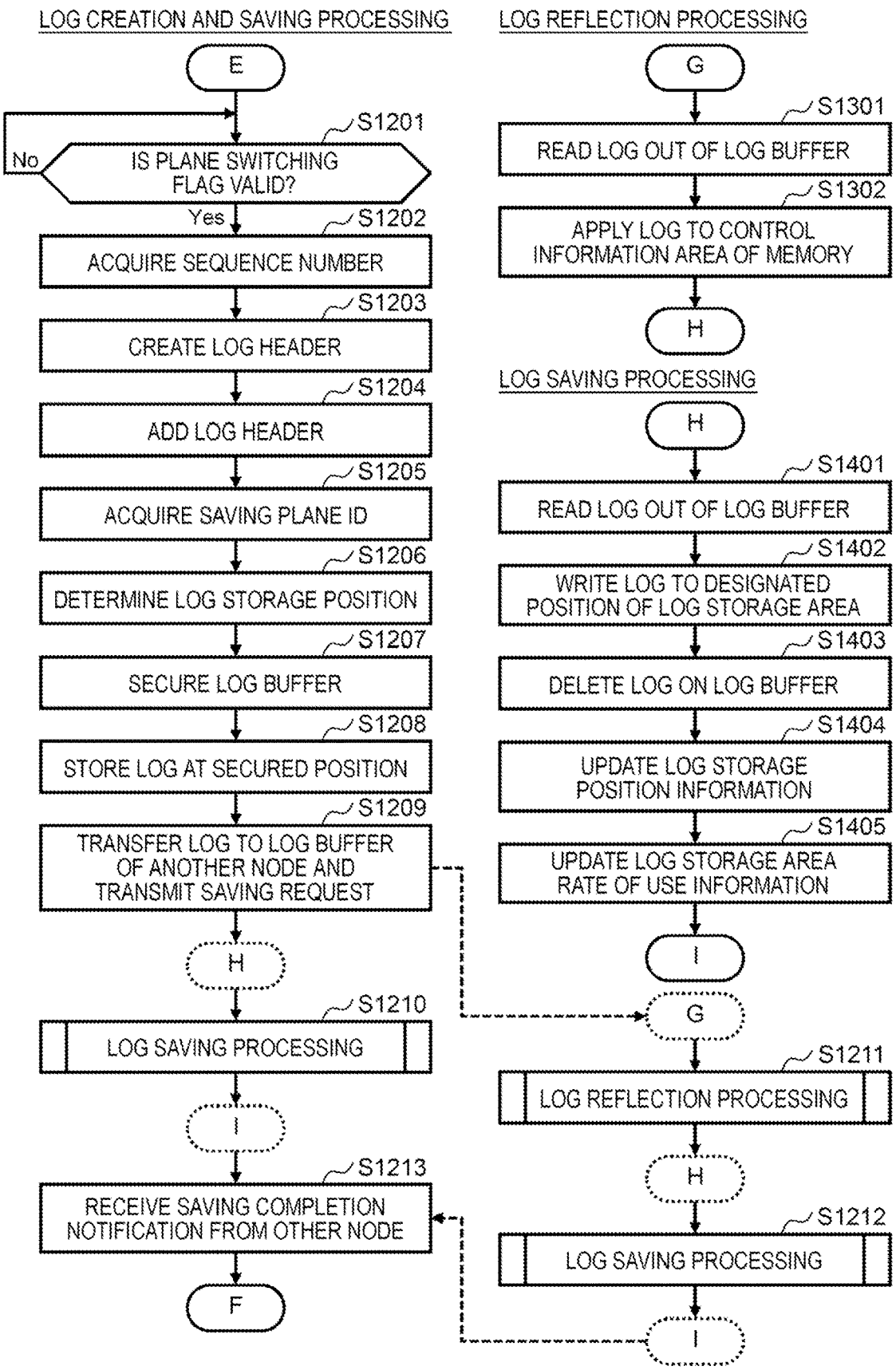
FIG. 24 is a flowchart of log creation and saving processing.

FIG. 24 is a flowchart of the log creation and saving processing. In the log creation processing, the storage controller 1083 creates a log by adding a log header to control information update content and then saves the log in a log storage area. At the same time, the log is transmitted to the process of the other storage controller 1083 of the same pair, and update content reflection in the control information area on the memory and saving in the log storage area are performed. After the log saving, the storage area end address on the memory and the storage device is updated.

Specifically, first, the storage controller 1083 determines whether or not the plane switching flag is valid (step S1201). If the plane switching flag is not valid (step S1201; No), the processing waits by repeating step S1201. The processing proceeds to step S1202 if the plane switching flag is valid (step S1201; Yes).

In step S1202, the storage controller 1083 acquires a sequence number. After that, the storage controller 1083 creates a log header (step S1203) and adds the log header (step S1204).

After that, the storage controller 1083 acquires a saving plane ID from the base image storage area management table on the memory (step S1205). In addition, the storage controller 1083 acquires the log end side address of the saving plane side log storage area from the log storage area management table on the memory and determines that address as a log storage position (step S1206). Then, a log buffer is secured (step S1207), and the log is stored at the secured position (step S1208).

After that, the storage controller 1083 transfers the log to the log buffer of another node and transmits a saving request (step S1209). Then, the log saving processing of the own node is performed (step S1210). The node that has received the log transfer reflects the log (step S1211) and performs the log saving processing of the own node (step S1212).

The storage controller 1083 of the node that has transmitted the saving request receives saving completion notification from the other node (step S1213) and ends the processing.

In the log reflection processing, the storage controller 1083 reads the log out of the log buffer (step S1301), applies the log to the control information area of the memory (step S1302), makes the control information redundant, and ends the log reflection processing.

In the log saving processing, the storage controller 1083 reads the log out of the log buffer (step S1401) and writes the log to a designated position in the log storage area (step S1402). Then, the log on the log buffer is deleted (step S1403), and the log storage position information is updated (step S1404). In updating the log storage position information, the end address of the saving plane side log storage area of the log storage area management table on the memory and the log storage area information table on the storage device is updated. After that, information on the rate of use of the log storage area is updated (step S1405), and the log saving processing ends.

Figure 25:
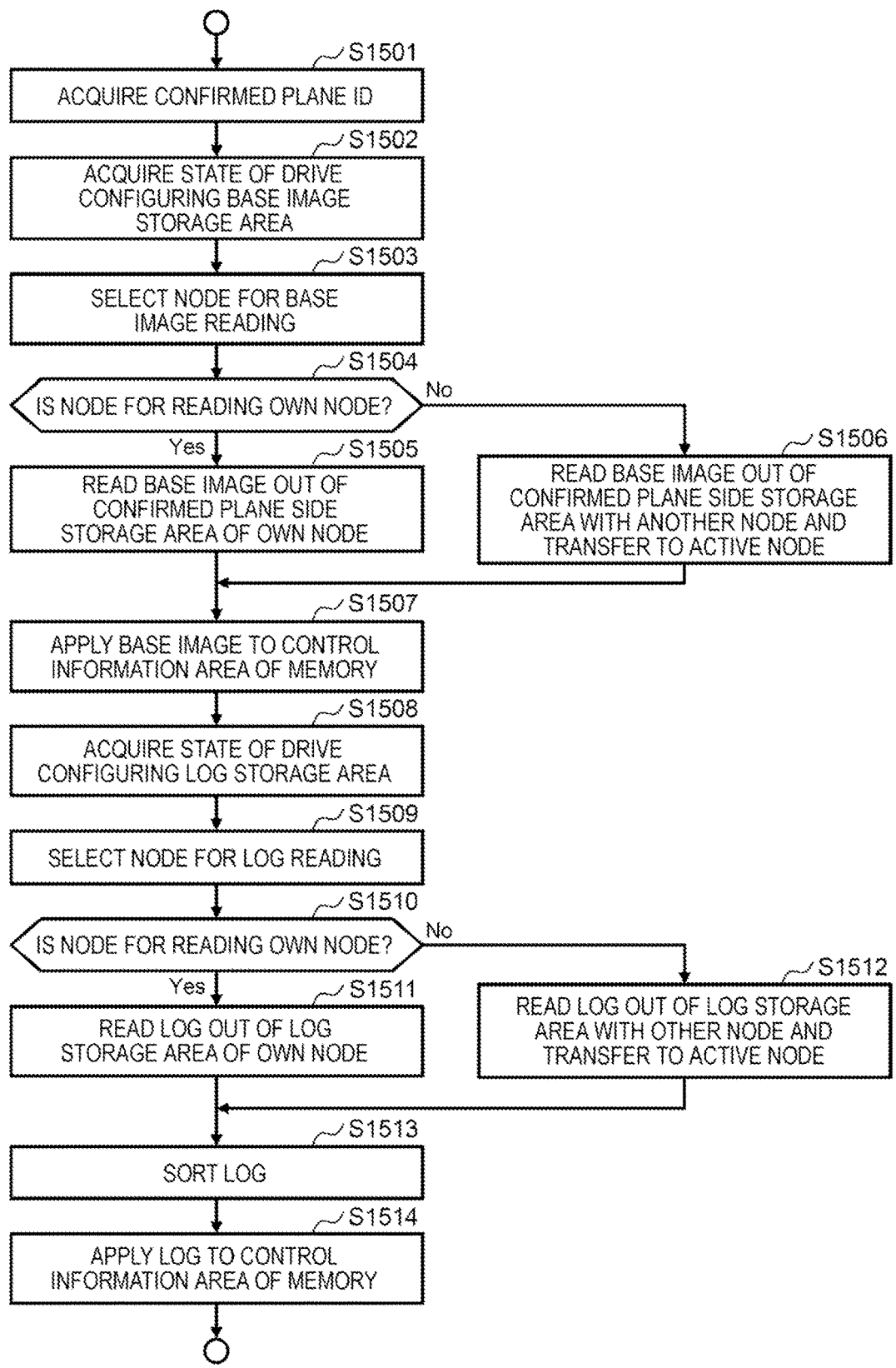
FIG. 25 is a flowchart of the recovery processing.

FIG. 25 is a flowchart of the recovery processing.

Illustrated here is an active process-led operation as an example of recovery processing following loss of control information on the memory.

In this recovery processing, a base image and a log saved before a power failure are applied to the memory, and the control information on the memory is recovered.

As an overview, the confirmed plane information saved on the storage device is read out, and a base image is read out of the base image storage area pointed to by the information and applied to the memory. After that, a log following the sequence number of the confirmed plane is read out of the log storage area, sorted, and then applied to the memory in sequence number order.

In a case where the base image or the log cannot be read out due to a drive failure, the storage controller reads it out of the other process (standby process) of the same pair.

In a case where the process that was active before the occurrence of the power failure cannot be launched due to a node failure, the standby process of the pair operates as the active process and performs the recovery processing.

Specifically, upon starting the recovery processing, the storage controller 1083 acquires a confirmed plane ID by reading confirmed plane information out of the base image storage area information table on the storage device (step S1501). In addition, the storage controller 1083 acquires the state of the drive configuring the base image storage area (step S1502). Then, the storage controller 1083 selects a node for base image reading (step S1503). For example, in the case of a drive failure, an attempt is made to read out of another node.

If the node for reading is the own node (step S1504; Yes), the storage controller 1083 reads a base image out of the confirmed plane side storage area of the own node (step S1505).

If the node for reading is not the own node (step S1504; No), another node reads a base image out of the confirmed plane side storage area and transfers the image to the active node (step S1506).

After step S1505 or S1506 ends, the storage controller 1083 applies the base image to the control information area of the memory (step S1507) and acquires the state of the drive configuring the log storage area (step S1508).

After step S1508, the storage controller 1083 selects a node for log reading (step S1509). For example, in the case of a drive failure, an attempt is made to read out of another node.

If the node for reading is the own node (step S1510; Yes), the storage controller 1083 reads the log out of the log storage area of the own node (step S1511). Specifically, the log start and end addresses of each storage area are read out of the log storage area information table on the storage device, and then the log is read out of the range of each storage area.

If the node for reading is not the own node (step S1510; No), another node reads the log out of the log storage area and transfers the log to the active node (step S1512).

After step S1511 or S1512 ends, the storage controller 1083 sorts the read log in sequence number order (step S1513), applies the log following the sequence number assigned to the applied base image to the control information area of the memory (step S1514), and ends the recovery processing.

As described above, the disclosed storage system 100 is a storage system including one or more storage nodes 103 each having a non-volatile storage device 1033, a storage controller 1083 processing data reading and writing with respect to the storage device 1033, and a volatile memory 1032, in which the storage device 1033 includes a plurality of base image storage areas including at least a first base image storage area and a second base image storage area as areas for storing entire predetermined information stored in the memory 1032 as a base image, and the storage controller 1083 performs processing to store the base image in the first base image storage area and, when the base image storage with respect to the first base image storage area is complete, starts processing to store a next base image in the second base image storage area, and performs recovery processing to read out the storage-completed base image and restore the image to the memory in a case where the predetermined information is lost from the memory 1032.

Therefore, information on the memory can be recovered even in the event of a power failure during base image saving, and a high-performance and high-reliability storage system can be realized.

As an example, the storage controller 1083 starts processing to store a next base image in the first base image storage area when the base image storage with respect to the second base image storage area is complete, and suppresses execution of the reading and writing processing with respect to the storage device in a case where a storage destination of the base image is in a process of switching between the first base image storage area and the second base image storage area.

In this manner, by alternately using two storage area planes, storage area size suppression and power failure response can be realized at the same time.

In addition, as an example, the storage controller 1083 starts processing to store a next base image in a third base image storage area when the base image storage with respect to the second base image storage area is complete, starts processing to store a next base image in the first base image storage area when the base image storage with respect to the third base image storage area is complete, and executes the reading and writing processing with respect to the storage device even in a case where a storage destination area for the base image is in a process of switching.

In this manner, by sequentially using three storage area planes, it is possible to respond to a power failure without stopping reading and writing processing.

In addition, as an example, the predetermined information is control information, the storage device 1033 includes a plurality of log storage areas for storing update content of the control information as a log in association with the plurality of base image storage areas, the storage controller 1083 stores the update content of the control information in a corresponding log storage area while performing processing to store a base image of the control information in one of the base image storage areas, and during the recovery processing, the storage controller reads a storage-completed base image out of the base image storage area and writes the image to the memory and then reads a log acquired from the start of the base image storage until loss of the control information out of the log storage area and writes the log to the memory to restore the control information.

In this manner, by associating a plurality of log storage areas with a plurality of base image storage areas, it is possible to respond to a power failure with ease.

In addition, as an example, the predetermined information is control information, the storage device 1033 includes a log storage area for storing update content of the control information as a log, the storage controller 1083 records a storage position of the log storage area in response to switching of a base image storage area used as a storage destination of the base image, and during the recovery processing, the storage controller reads a storage-completed base image out of the base image storage area and writes the image to the memory and then reads a log acquired from the start of the base image storage until loss of the control information out of the log storage area and writes the log to the memory to restore the control information.

In this manner, by dividing one log storage area to correspond to a plurality of base image storage areas, the size of the log storage area can be suppressed.

In addition, the storage controller 1083 duplicates the predetermined information present in the memory and stores the information in the base image storage area as the base image.

Alternatively, in a case where the storage-completed base image is present, a log related to the predetermined information may be applied to the base image and storage as a new base image may be performed in the base image storage area.

In this manner, base image creation can be performed by any method.

In addition, the predetermined information is control information, the plurality of storage nodes make the control information redundant by storing the control information in each memory, and the storage controller 1083 of each storage node stores entire control information stored in a memory of own node in the storage device as the base image.

Alternatively, the predetermined information may be control information, the storage controller 1083 of one of the plurality of storage nodes may store entire control information stored in a memory of own node in the storage device of the own node as the base image and transmit the base image to another storage node, and the storage controller of a storage node that has received the base image from the other storage node among the plurality of storage nodes may store the received base image in the storage device of the own node.

In this manner, each node may create and save a base image or each node may save a base image created by one node.

In addition, the storage controller 1083 is capable of dividing and storing the base image in a plurality of the storage devices.

In this manner, by making a base image redundant, failure resistance can be improved.

In addition, the storage controller 1083 acquires a base image stored in the base image storage area of another storage node and writes the image to a memory of own node when a failure has occurred in the storage device of the own node.

In this manner, base image recovery is possible even in the event of a storage device failure.

In addition, when a failure has occurred in one of the plurality of storage nodes, the storage controller of another storage node acquires a base image stored in the base image storage area of the storage node and writes the image to the memory of the storage node.

In this manner, base image recovery is possible even in the event of a storage node failure.

It should be noted that the invention is not limited to the above example and includes various modification examples. For example, the above example has been described in detail in order to describe the invention in an easy-to-understand manner and is not necessarily limited to one including every described configuration. In addition, not only deletion of such a configuration but also replacement and addition in configuration are possible.

For example, although saving control information as a base image has been exemplified in the example, the invention is also applicable to saving other data such as cache data as a base image.

What is claimed is:

1. A storage system comprising one or more storage nodes each having a non-volatile storage device, a storage controller processing data reading and writing with respect to the storage device, and a volatile memory,
wherein the storage device includes a plurality of base image storage areas including at least a first base image storage area and a second base image storage area as areas for storing entire predetermined information stored in the memory as a base image,
wherein the storage controller:
performs processing to store the base image in the first base image storage area and, when the base image storage with respect to the first base image storage area is complete, starts processing to store a next base image in the second base image storage area; and
performs recovery processing to read out the storage-completed base image and restore the image to the memory in a case where the predetermined information is lost from the memory, and
wherein the storage controller:
starts processing to store a next base image in the first base image storage area when the base image storage with respect to the second base image storage area is complete, and
suppresses execution of the reading and writing processing with respect to the storage device in a case where a storage destination of the base image is in a process of switching between the first base image storage area and the second base image storage area.

2. The storage system according to claim 1, wherein the predetermined information is control information, the storage device includes a plurality of log storage areas for storing update content of the control information as a log in association with the plurality of base image storage areas,
the storage controller stores the update content of the control information in a corresponding log storage area while performing processing to store a base image of the control information in one of the base image storage areas, and
during the recovery processing, the storage controller reads a storage-completed base image out of the base image storage area and writes the image to the memory and then reads a log acquired from the start of the base image storage until loss of the control information out of the log storage area and writes the log to the memory to restore the control information.

3. The storage system according to claim 1, wherein the predetermined information is control information, the storage device includes a log storage area for storing update content of the control information as a log,
the storage controller records a storage position of the log storage area in response to switching of a base image storage area used as a storage destination of the base image, and
during the recovery processing, the storage controller reads a storage-completed base image out of the base image storage area and writes the image to the memory and then reads a log acquired from the start of the base image storage until loss of the control information out of the log storage area and writes the log to the memory to restore the control information.

4. The storage system according to claim 1, wherein the storage controller duplicates the predetermined information present in the memory and stores the information in the base image storage area as the base image.

5. The storage system according to claim 1, wherein, in a case where the storage-completed base image is present, a log related to the predetermined information is applied to the base image and storage as a new base image is performed in the base image storage area.

6. The storage system according to claim 1, wherein the predetermined information is control information, the plurality of storage nodes make the control information redundant by storing the control information in each memory, and
the storage controller of each storage node stores entire control information stored in a memory of own node in the storage device as the base image.

7. The storage system according to claim 1, wherein the predetermined information is control information, the storage controller of one of the plurality of storage nodes stores entire control information stored in a memory of own node in the storage device of the own node as the base image and transmits the base image to another storage node, and
the storage controller of a storage node that has received the base image from the other storage node among the plurality of storage nodes stores the received base image in the storage device of the own node.

8. The storage system according to claim 1, wherein the storage controller divides and stores the base image in a plurality of the storage devices.

9. A storage system comprising one or more storage nodes each having a non-volatile storage device, a storage controller processing data reading and writing with respect to the storage device, and a volatile memory,
wherein the storage device includes a plurality of base image storage areas including at least a first base image storage area and a second base image storage area as areas for storing entire predetermined information stored in the memory as a base image,
wherein the storage controller:
performs processing to store the base image in the first base image storage area and, when the base image storage with respect to the first base image storage area is complete, starts processing to store a next base image in the second base image storage area; and
performs recovery processing to read out the storage-completed base image and restore the image to the memory in a case where the predetermined information is lost from the memory, and
wherein the storage controller:

starts processing to store a next base image in a third base image storage area when the base image storage with respect to the second base image storage area is complete,
    starts processing to store a next base image in the first base image storage area when the base image storage with respect to the third base image storage area is complete, and
    executes the reading and writing processing with respect to the storage device even in a case where a storage destination area for the base image is in a process of switching.

10. A storage system comprising one or more storage nodes each having a non-volatile storage device, a storage controller processing data reading and writing with respect to the storage device, and a volatile memory,
    wherein the storage device includes a plurality of base image storage areas including at least a first base image storage area and a second base image storage area as areas for storing entire predetermined information stored in the memory as a base image,
    wherein the storage controller:
        performs processing to store the base image in the first base image storage area and, when the base image storage with respect to the first base image storage area is complete, starts processing to store a next base image in the second base image storage area; and
        performs recovery processing to read out the storage-completed base image and restore the image to the memory in a case where the predetermined information is lost from the memory, and
    wherein the storage controller acquires a base image stored in the base image storage area of another storage node and writes the image to a memory of own node when a failure has occurred in the storage device of the own node.

11. A storage system comprising one or more storage nodes each having a non-volatile storage device, a storage controller processing data reading and writing with respect to the storage device, and a volatile memory,
    wherein the storage device includes a plurality of base image storage areas including at least a first base image storage area and a second base image storage area as areas for storing entire predetermined information stored in the memory as a base image,
    wherein the storage controller:
        performs processing to store the base image in the first base image storage area and, when the base image storage with respect to the first base image storage area is complete, starts processing to store a next base image in the second base image storage area; and
        performs recovery processing to read out the storage-completed base image and restore the image to the memory in a case where the predetermined information is lost from the memory, and
    wherein, when a failure has occurred in one of the plurality of storage nodes, the storage controller of another storage node acquires a base image stored in the base image storage area of the storage node and writes the image to the memory of the storage node.

12. A storage control method in a storage system including one or more storage nodes each having a non-volatile storage device, a storage controller processing data reading and writing with respect to the storage device, and a volatile memory, the method comprising:
    a step in which the storage controller stores entire predetermined information stored in the memory as a base image in a first base image storage area provided in the storage device;
    a step in which the storage controller stores a next base image in a second base image storage area provided in the storage device when the base image storage with respect to the first base image storage area is complete; and
    a step in which the storage controller performs recovery processing to read out the storage-completed base image and restore the image to the memory in a case where the predetermined information is lost from the memory,
    wherein the storage controller:
        starts processing to store a next base image in the first base image storage area when the base image storage with respect to the second base image storage area is complete, and
        suppresses execution of the reading and writing processing with respect to the storage device in a case where a storage destination of the base image is in a process of switching between the first base image storage area and the second base image storage area.

* * * * *